(12) United States Patent
Yamagishi

(10) Patent No.: US 6,710,808 B1
(45) Date of Patent: Mar. 23, 2004

(54) IMAGE SENSING APPARATUS

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,172

(22) Filed: Nov. 3, 1999

(30) Foreign Application Priority Data

Nov. 4, 1998 (JP) .......................... 10-327550

(51) Int. Cl.⁷ .......................... H04N 5/235; G03B 7/00
(52) U.S. Cl. .................... 348/362; 348/221.1
(58) Field of Search ................ 348/362, 363, 348/364, 241, 312, 243, 231.99, 222.1, 221.1, 220.1, 224.1

(56) References Cited

U.S. PATENT DOCUMENTS

| | | | | |
|---|---|---|---|---|
| 5,327,193 A | * | 7/1994 | Date et al. .................. | 396/242 |
| 6,084,634 A | * | 7/2000 | Inagaki et al. ............. | 348/294 |
| 2002/0008766 A1 | * | 1/2002 | Tariki ......................... | 348/243 |
| 2002/0186313 A1 | * | 12/2002 | Kidono et al. .............. | 348/362 |

* cited by examiner

Primary Examiner—Aung Moe
(74) Attorney, Agent, or Firm—Morgan & Finnegan, LLP

(57) ABSTRACT

There is disclosed an apparatus having an image sensing device, an image sensing time fixing instruction device for instructing to fix the image sensing time so as to inhibit the image sensing time of the image sensing device from changing in each image sensing, and a signal processing device for performing a first image sensing operation for making the image sensing device perform an image sensing operation in an exposure state to obtain a sensed image signal, and a second image sensing operation for making the image sensing device perform an image sensing operation in a non-exposure state to obtain a sensed image signal, and processing the sensed image signal obtained by the first image sensing operation by the sensed image signal obtained by the second image sensing operation, the signal processing device having a first mode for making the image sensing device perform the first image sensing operation and then the second image sensing operation, and a second mode for making the image sensing device perform the second image sensing operation and then the first image sensing operation, and the image processing device operating in the second mode if the image sensing time fixing instruction device instructs to fix the image sensing time.

13 Claims, 14 Drawing Sheets

IMAGE SENSING APPARATUS

BACKGROUND OF THE INVENTION

1. Field of the Invention

The present invention relates to an image sensing apparatus for sensing a still image and/or moving image.

2. Description of the Related Art

Conventionally, image sensing apparatuses such as electronic cameras and the like, which record/play back still images and moving images sensed by a solid-state image sensing element such as a CCD or the like using memory cards having solid-state memory elements as recording media, have already been commercially available.

Since these electronic cameras have an auto-focusing (AF) function and auto-exposure (AE) function, the electronic camera user can easily take a picture.

Especially, in servo AF operation that keeps focusing on an object by following its movement, an in-focus is maintained by following the object movement, and exposure measurement (AE) is also done by following the object movement, thus updating the aperture value (Av value) and shutter speed (Tv value) as needed.

When the electronic camera further has an AE lock function, if the exposure measurement value of the object is fixed and inhibited from being updated, auto-focusing (AF) and auto-exposure (AE) can be independently controlled.

On the other hand, when an image is sensed using a solid-state image sensing element such as a CCD or the like, a dark noise correction process can be done by computations using dark image data which is read out after charge accumulation in the same manner as in actual image sensing while the image sensing element is not exposed, and actually sensed image data which is read out after charge accumulation while the image sensing element is exposed.

With this process, sensed image data can be corrected for image quality deterioration such as pixel omission or the like caused by dark current noise produced by the image sensing element and small scratches unique to the image sensing element, thus obtaining a high-quality sensed image.

Especially, since dark current noise increases with increasing charge accumulation time and temperature rise of the image sensing element, if exposure for a long period of time (seconds) or at high temperature is done, a great image quality improvement effect can be obtained, and the dark noise correction process is a function useful for the electronic camera users.

The charge accumulation time must be determined in correspondence with the shutter speed (Tv value) obtained by exposure measurement.

In the servo AF operation that keeps focusing on an object by following its movement, since the exposure measurement value must be updated every time the object luminance has changed, the shutter speed is determined after the exposure value is settled upon depression of the shutter switch, and the CCD charge accumulation time is determined accordingly. For this reason, after the shutter switch is pressed, actual image sensing and sensing of a dark image are done.

For this reason, when dark image data is sensed after actual image sensing, the interval between the first and second frames is prolonged by the dark image sensing time, and constant image sensing frame intervals cannot be set.

On the other hand, when actual image sensing is done after dark image data is sensed, the shutter release time lag becomes large since actual image sensing cannot be started until the dark image data capture process is completed, thus missing a shutter chance.

SUMMARY OF THE INVENTION

One aspect of the present invention is to provide an apparatus, which comprises an image sensing device, an image sensing time fixing instruction device for instructing to fix an image sensing time so as to inhibit the image sensing time of the image sensing device from changing in each image sensing, and a signal processing device for performing a first image sensing operation for making the image sensing device perform an image sensing operation in an exposure state to obtain a sensed image signal, and a second image sensing operation for making the image sensing device perform an image sensing operation in a non-exposure state to obtain a sensed image signal, and processing the sensed image signal obtained by the first image sensing operation by the sensed image signal obtained by the second image sensing operation, the signal processing device having a first mode for making the image sensing device perform the first image sensing operation and then the second image sensing operation, and a second mode for making the image sensing device perform the second image sensing operation and then the first image sensing operation, and the image processing device operating in the second mode if the image sensing time fixing instruction device instructs to fix the image sensing time, thereby preventing a shutter chance from being missed, and setting constant image sensing frame intervals.

Another aspect of the present invention is to provide an apparatus, which comprises an image sensing device, an image sensing time fixing instruction device for instructing to fix an image sensing time so as to inhibit the image sensing time of the image sensing device from changing in each image sensing, an exposure instruction device for issuing an exposure preparation instruction at a first stroke position of a shutter release member, and issuing an exposure start instruction at a second stroke position of the shutter release member, and a signal processing device for performing a first image sensing operation for making the image sensing device perform an image sensing operation in an exposure state to obtain a sensed image signal, and a second image sensing operation for making the image sensing device perform an image sensing operation in a non-exposure state to obtain a sensed image signal, and processing the sensed image signal obtained by the first image sensing operation by the sensed image signal obtained by the second image sensing operation, the signal processing device performing the second image sensing operation in response to the exposure preparation instruction issued by the exposure instruction device if the image sensing time fixing instruction device instructs to fix the image sensing time, thereby preventing a shutter chance from being missed, and setting constant image sensing frame intervals.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described hereinafter with reference to the accompanying drawings.

[First Embodiment]

Figure 1:
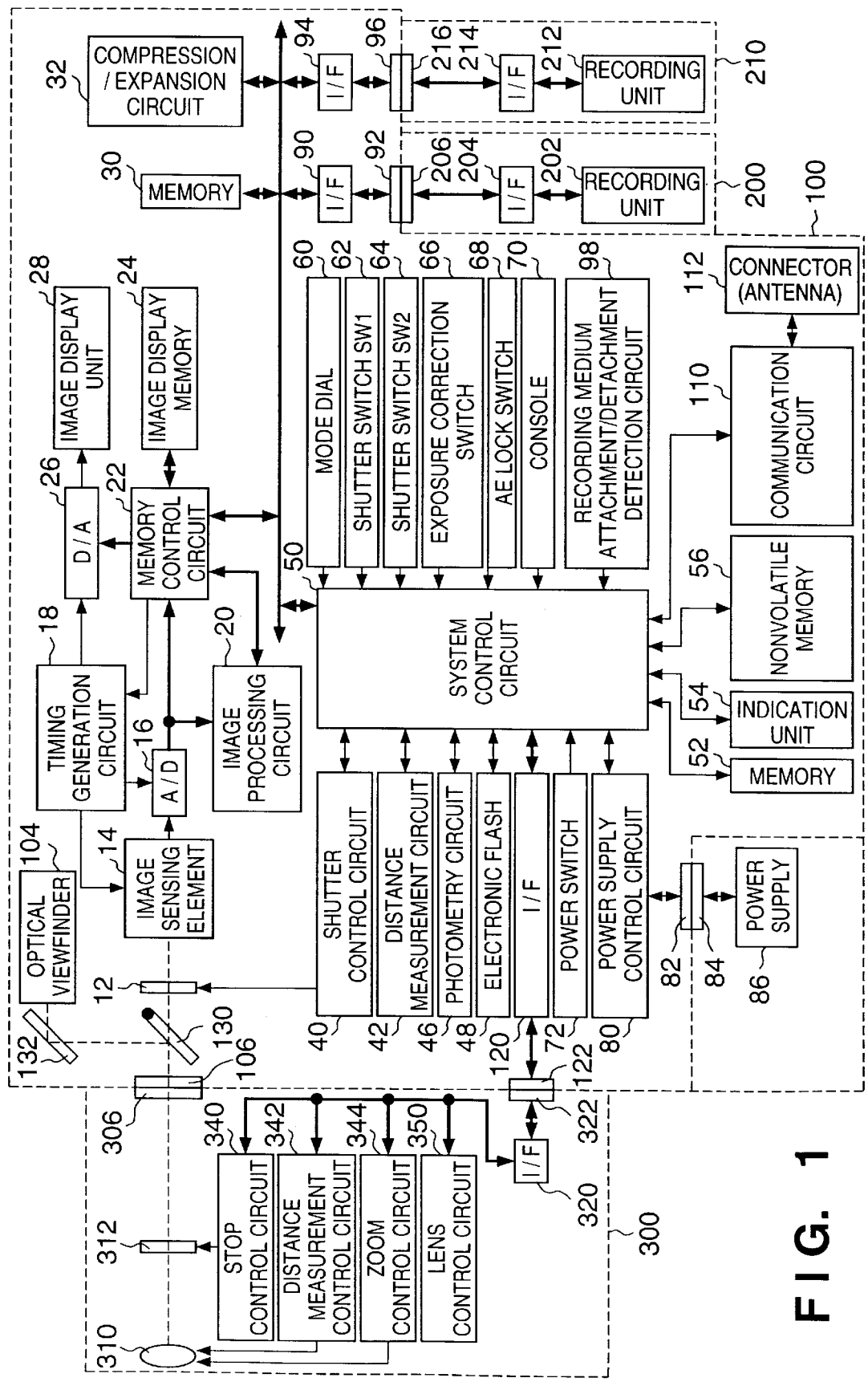
FIG. 1 is a block diagram showing the arrangement of an image sensing apparatus according to the first embodiment of the present invention.

FIG. 1 is a block diagram showing the arrangement of an image sensing apparatus according to the first embodiment of the present invention.

Referring to FIG. 1, reference numeral 100 denotes an image sensing apparatus.

Reference numeral 12 denotes a shutter for controlling the exposure amount on an image sensing element; and 14, an image sensing element such as a CCD, CMOS, or the like for converting an optical image into an electrical signal.

Light rays that have entered a lens 310 are guided onto the image sensing element 14 via a stop 312, lens mounts 306 and 106, a mirror 130, and the shutter 12 by a single-lens reflex system, and form an optical image on the image sensing element 14.

Reference numeral 16 denotes an A/D converter for converting an analog signal output into a digital signal.

Reference numeral 18 denotes a timing generation circuit for supplying clock signals and control signals to the image sensing element 14, the A/D converter 16, and a D/A converter 26. The timing generation circuit 18 is controlled by a memory control circuit 22 and system control circuit 50.

Reference numeral 20 denotes an image processing circuit for performing a predetermined pixel interpolation process and color conversion process for data from the A/D converter 16 or the memory control circuit 22.

Also, the image processing circuit 20 can execute a TTL (through the lens) AF (auto-focus) process, AE (auto-exposure) process, and EF (flash light control) process. In these processes, the image processing circuit 20 makes predetermined computations using sensed image data as needed, and the system control circuit 50 controls a shutter control circuit 40 and distance measurement circuit 42 on the basis of the obtained computation result.

Furthermore, the image processing circuit 20 makes predetermined computations using sensed image data, and executes a TTL AWB (auto white balance) process on the basis of the obtained computation result.

Since this embodiment comprises the distance measurement circuit 42 and a photometry circuit 46 dedicated to those processes, the AF, AE, and EF processes may be done using the distance measurement circuit 42 and photometry circuit 46 in place of those using the image processing circuit 20.

Alternatively, the AF, AE, and EF processes may be done using the distance measurement circuit 42 and photometry circuit 46 in addition to those using the image processing circuit 20.

Reference numeral 22 denotes a memory control circuit which controls the A/D converter 16, the timing generation circuit 18, the image processing circuit 20, an image display memory 24, the D/A converter 26, a memory 30, and a compression/expansion circuit 32.

Data output from the A/D converter 16 is written in the image display memory 24 or memory 30 via the image processing circuit 20 and memory control circuit 22 or via the memory control circuit 22 alone.

Reference numeral 24 denotes an image display memory; 26, a D/A converter; and 28, an image display unit comprising, e.g., a TFT LCT or the like. Display image data written in the image display memory 24 is displayed on the image display unit 28 via the D/A converter 26.

When sensed image data is displayed using the image display unit 28 as needed, an electronic viewfinder function can be implemented.

The image display unit 28 can turn on/off its display in accordance with an instruction from the system control circuit 50. When the display is OFF, great power savings of the image sensing apparatus 100 can be achieved.

Reference numeral 30 denotes a memory for storing sensed still or moving images. The memory 30 has a sufficient memory size capable of storing a predetermined number of still images or a moving image for a predetermined period of time. Hence, even in a continuous shot mode or panorama mode for continuously sensing a plurality of still images, a large number of images can be written in the memory 30 at high speed.

Also, the memory 30 can be used as a work area of the system control circuit 50.

Reference numeral 32 denotes a compression/expansion circuit for compressing/expanding image data by the adaptive discrete cosine transform (ADCT), wavelet transform, or the like. The compression/expansion circuit 32 loads an image stored in the memory 30, compresses or expands it, and writes the compressed or expanded data in the memory 30.

Reference numeral 40 denotes a shutter control circuit for controlling the shutter 12 on the basis of photometry information from the photometry circuit 46 in cooperation with a stop control circuit 340 that controls the stop 312.

Reference numeral 42 denotes a distance measurement circuit used to execute the AF process. Light rays that have entered the lens 310 are guided to the distance measurement circuit 42 via the stop 312, the lens mounts 306 and 106, the mirror 130, and a distance measurement sub-mirror (not shown) by the single-lens reflex system, thus measuring the focusing state of an image formed as an optical image.

Reference numeral 46 denotes a photometry circuit used to execute the AE process. Light rays that have entered the lens 310 are guided to the photometry circuit 46 via the stop 312, the lens mounts 306 and 106, the mirror 130 and a mirror 132, and a photometry lens (not shown), thus measuring the exposure state of an image formed as an optical image.

The photometry circuit 46 also has an EF process function in cooperation with an electronic flash 48.

Reference numeral 48 denotes an electronic flash which has a function of projecting AF assist light, and a flash light control function.

Note that the system control circuit 50 can perform exposure control and AF control using a video TTL scheme for the shutter control circuit 40, stop control circuit 340, and distance measurement control circuit 342 on the basis of a computation result of image data output from the image sensing element 14 by the image processing circuit 20.

Furthermore, AF control may be done using both the measurement result of the distance measurement circuit 42 and the computation result of image data output from the image sensing element 14 by the image processing circuit 20.

Moreover, exposure control may be done using both the measurement result of the photometry circuit 46 and the computation result of image data output from the image sensing element 14 by the image processing circuit 20.

Reference numeral 50 denotes a system control circuit for controlling the overall image sensing apparatus 100; and 52, a memory for storing constants, variables, programs, and the like required for operating the system control circuit 50.

Reference numeral 54 denotes an indication unit which comprises a liquid crystal display device, loudspeaker, and the like, and indicates the operation state, messages, and the like using characters, images, sound, and the like in accordance with execution of programs in the system control circuit 50. The indication unit 54 is set at one or a plurality of easy-to-see positions around the console of the image sensing apparatus 100, and is constructed by a combination of an LCD, LEDs, sound generation element, and the like. Some functions of the indication unit 54 are set within an optical viewfinder 104.

Of the indication contents of the indication unit 54, those displayed on the LCD or the like include, e.g., a single/continuous shot indication, self timer indication, compression ratio indication, recording pixel count indicating, recorded image count indication, remaining recordable image count indication, shutter speed indication, aperture value indication, exposure correction indication, flash indication, red-eye suppression indication, macro image sensing indication, buzzer setup indication, remaining timepiece battery capacity indication, remaining battery capacity indication, error indication, information indication using numerals of a plurality of digits, attachment/detachment indication of recording media 200 and 210, attachment/detachment indication of a lens unit 300, communication I/F operation indication, date/time indication, connection indication with an external computer, and the like.

Of the indication contents of the indication unit 54, those displayed within the optical viewfinder 104 include, e.g., in-focus indication, image sensing ready indication, camera shake alert indication, flash charging indication, flash charging completion indication, shutter speed indication, aperture value indication, exposure correction indication, recording medium write access indication, and the like.

Furthermore, of the indication contents of the indication unit 54, those displayed using the LEDs and the like include, e.g., in-focus indication, image sensing ready indication, camera shake alert indication, flash charging indication, flash charging completion indication, recording medium write access indication, macro image sensing setup notification, secondary battery charging state indication, and the like.

Of the indication contents of the indication unit 54, those indicated by lamps and the like include, e.g., a self timer notification lamp, and the like. The self timer notification lamp may be commonly used as AF assist light.

Reference numeral 56 denotes an electrically erasable/programmable nonvolatile memory, which uses, e.g., an EEPROM or the like.

Reference numerals 60, 62, 64, 66, 68, and 70 denote operation units for inputting various operation instructions of a system control circuit 118. These operation units are constructed by one or a plurality of combinations of a switch, a dial, a touch panel, a pointer using line of sight detection, a voice recognition device, and the like.

Examples of these operation units will be explained below.

Reference numeral 60 denotes a mode dial switch which can selectively set one of various function image sensing modes: an automatic image sensing mode, programmed image sensing mode, shutter speed priority image sensing mode, aperture priority image sensing mode, manual image sensing mode, focal depth priority (depth) image sensing mode, portrait image sensing mode, landscape image sensing mode, macro image sensing mode, sport image sensing mode, night scene image sensing mode, panorama image sensing mode, and the like.

Reference numeral 62 denotes a shutter switch SW1, which is turned on at the middle (half stroke position) of operation of a shutter button (not shown), and instructs start of the AF process, AE process, AWB process, EF process, and the like.

Reference numeral 64 denotes a shutter switch SW2, which is turned on upon completion of operation (at the full stroke position) of the shutter button (not shown), and instructs start of a series of processes including an exposure process for writing a signal read out from the image sensing element 14 as image data in the memory 30 via the A/D converter 16 and memory control circuit 22, a development process using computation results in the image processing circuit 20 and memory control circuit 22, and a recording process for reading out image data from the memory 30, compressing the readout data by the compression/expansion circuit 32, and writing the compressed image data in the recording medium 200 or 210.

Reference numeral 66 denotes an exposure correction switch which is used to set an overexposure or underexposure value compared to a standard value by increasing/decreasing the measured exposure value of an object by a desired number of steps. Note that the exposure correction switch 66 can select the number of exposure correction steps more smoothly if it uses plus and minus buttons or a rotary dial switch together.

Reference numeral 68 denotes an AE lock switch which is used to fix the measured exposure value of the object and inhibit it from being updated. Especially, in the servo AF mode in which the auto-focusing (AF) and auto-exposure (AE) operations are repeated while the shutter switch SW1 is kept ON, it is very convenient since the exposure value can be fixed independently of the AF operation.

Reference numeral 70 denotes a console including various buttons, touch panel, and the like, which include a menu button, set button, macro button, multi-frame playback new page button, flash setup button, menu move + (plus) button, menu move − (minus) button, playback image move + (plus) button, playback image move − (minus) button, sensed image quality select button, exposure correct button, date/time setup button, select/change button that can select and change various functions upon executing image sensing and playback in, e.g., the panoramic mode, determine/execute button which can determine and execute various functions upon executing image sensing and playback in, e.g., the panoramic mode, image display ON/OFF switch for turning on/off the image display unit 28, quick review ON/OFF setup switch for setting a quick review function of automatically playing back sensed image data immediately after image sensing, compression mode switch for selecting a compression ratio of JPEG compression or selecting a CCDMW mode for converting directly converting a signal output from the image sensing element into digital data, and recording the digital data in a recording medium, playback mode switch for setting various function modes such as a playback mode, multi-frame playback/delete mode, PC connect mode, and the like, single/continuous shot switch, which can set one of a single shot mode for sensing one frame of image upon depression of the shutter switch SW2, and then setting a standby state, and a continuous shot mode for successively sensing images while the shutter switch SW2 is held down, AF mode setup switch which can set a one-shot AE mode for starting auto-focusing upon depression of the shutter switch SW1, and maintaining an in-focus state once it is attained, and a servo AF mode for continuously executing auto-focusing while the shutter switch SW1 is held down, playback switch which instructs to start playback operation for reading out an image sensed in a given image sensing mode from one of the memory 30 and the recording media 200 and 210, and displaying the readout image on the image display unit 28, and the like.

In place of the plus and minus buttons, a rotary dial switch may be used to select numerical values and functions more smoothly.

Reference numeral 72 denotes a power switch which can selectively set power-ON and power-OFF modes of the image sensing apparatus 100. Also, the power switch 72 can also selectively set power-ON and power-OFF modes of various accessories such as the lens unit 300, external electronic flash, recording media 200 and 210, and the like, which are connected to the image sensing apparatus 100.

Reference numeral 80 denotes a power supply control circuit which is comprised of a battery detection circuit, a DC-DC converter, a switch circuit for switching a block to be energized, and the like. The power supply control circuit 80 detects the presence/absence, type, and remaining battery amount of a battery attached, controls the DC-DC converter on the basis of such detection results and an instruction from the system control circuit 50, and supplies a required voltage to the respective units including the recording media for a required period of time.

Reference numerals 82 and 84 denote connectors; and 86, a power supply circuit. The power supply circuit 86 includes a primary battery such as an alkali battery, lithium battery, or the like, a secondary battery such as an NiCd battery, NiMH battery, Li battery, or the like, an AC adapter, and the like.

Reference numerals 90 and 94 denote interfaces with recording media such as a memory card, hard disk, and the like; 92 and 96, connectors for connecting recording media such as a memory card, hard disk, and the like; and 98, a recording medium attachment/detachment detection circuit for detecting whether or not the recording medium 200 or 210 is attached to the connector 92 and/or the connector 96.

Note that this embodiment has two sets of interfaces and connectors that receive the recording media. However, the number of sets of interfaces and connectors that receive the recording media is not particularly limited. Also, combinations of interfaces and connectors of different standards may be used.

As the interface and connector, those complying with the standards of a PCMCIA card, CF (compact flash) card, and the like may be used.

Furthermore, when the interfaces 90 and 94, and connectors 92 and 96 use those complying with the standards of a PCMCIA card, CF (compact flash) card, and the like, and various communication cards such as a LAN card, modem card, USB card, IEEE1394 card, P1284 card, SCSI card, PHS, and the like are connected thereto, image data and associated management information can be transferred between the image sensing apparatus and an external computer or its peripheral devices such as a printer and the like.

Reference numeral 104 denotes an optical viewfinder which can guide light rays that have entered the lens 310 via the stop 312, lens mounts 306 and 106, mirrors 130 and 132 by the single-lens reflex system, and can form and display them as an optical image. In this manner, without using the electronic viewfinder function implemented by the image display unit 28, image sensing can be done using the optical viewfinder 104 alone. In the optical viewfinder 104, some functions of the indication unit 54, e.g., an in-focus indication, camera shake alert indication, flash charging indication, shutter speed indication, aperture value indication, exposure correction indication, and the like are provided.

Reference numeral 110 denotes a communication circuit having various communication functions such as RS232C, USB, IEEE1394, P1284, SCSI, modem, LAN, radio communication, and the like.

Reference numeral 112 denotes a connector or antenna, which serves as a connector when the image sensing apparatus 100 is connected to another device using the communication means 139, or serves as an antenna in case of radio communications.

Reference numeral 120 denotes an interface for connecting the image sensing apparatus 100 to the lens unit 300 in the lens mount 106; 122, a connector for electrically connecting the image sensing apparatus 100 to the lens unit 300; and 124, a lens attachment/detachment detection circuit for detecting whether or not the lens unit 300 is attached to the lens mount 106 and/or the connector 122.

The connector 122 also has a function of exchanging control signals, status signals, data signals, and the like between the image sensing apparatus 100 and lens unit 300, and supplying currents of various voltages. The connector 122 may communicate not only electrical signals but also optical signals, audio signals, and the like.

Reference numerals 130 and 132 denote mirrors which can guide light rays that have entered the lens 310 to the optical viewfinder 104 by the single-lens reflex system. Note that the mirror 132 may be either a quick return mirror or half mirror.

Reference numeral 200 denotes a recording medium such as a memory card, hard disk, or the like. The recording medium 200 comprises a recording unit 202 comprised of a semiconductor memory, magnetic disk, or the like, an interface 204 with the image sensing apparatus 100, and a connector 206 for connecting the image sensing apparatus 100.

Reference numeral 210 denotes a recording medium such as a memory card, hard disk, or the like. The recording medium 210 comprises a recording unit 212 comprised of a semiconductor memory, magnetic disk, or the like, an interface 214 with the image sensing apparatus 100, and a connector 216 for connecting the image sensing apparatus 100.

Reference numeral 300 denotes an exchangeable lens type lens unit.

Reference numeral 306 denotes a lens mount for mechanically coupling the lens unit 300 to the image sensing apparatus 100. The lens mount 306 includes various functions of electrically connecting the lens unit 300 and image sensing apparatus 100.

Reference numeral 310 denotes a photographing lens; and 312, a stop.

Reference numeral 320 denotes an interface for connecting the lens unit 300 to the image sensing apparatus 100 in the lens mount 306; and 322, a connector for electrically connecting the lens unit 300 to the image sensing apparatus 100. The connector 322 also has a function of exchanging control signals, status signals, data signals, and the like between the image sensing apparatus 100 and lens unit 300, and receiving or supplying currents of various voltages. Note that the connector 322 may communicate not only electrical signals but also optical signals, audio signals, and the like.

Reference numeral 340 denotes a stop control circuit for controlling the stop 312 on the basis of photometry information from the photometry circuit 46 in cooperation with the shutter control circuit 40 that controls the shutter 12.

Reference numeral 342 denotes a distance measurement control circuit for controlling focusing of the photographing lens 310; and 344, a zoom control circuit for controlling zooming of the photographing lens 310.

Reference numeral 350 denotes a lens system control circuit for controlling the overall lens unit 300. The lens system control circuit 350 has a memory function of storing constants, variables, programs, and the like required for operating the lens unit 300, and a nonvolatile memory function of holding identification information such as a number or the like unique to the lens unit 300, management information, function information such as a full-aperture value, minimum aperture value, focal length, and the like, current and past setup values, and the like.

The operation of the image sensing apparatus with the above arrangement will be explained below with reference to FIGS. 2 to 9.

Figure 2:
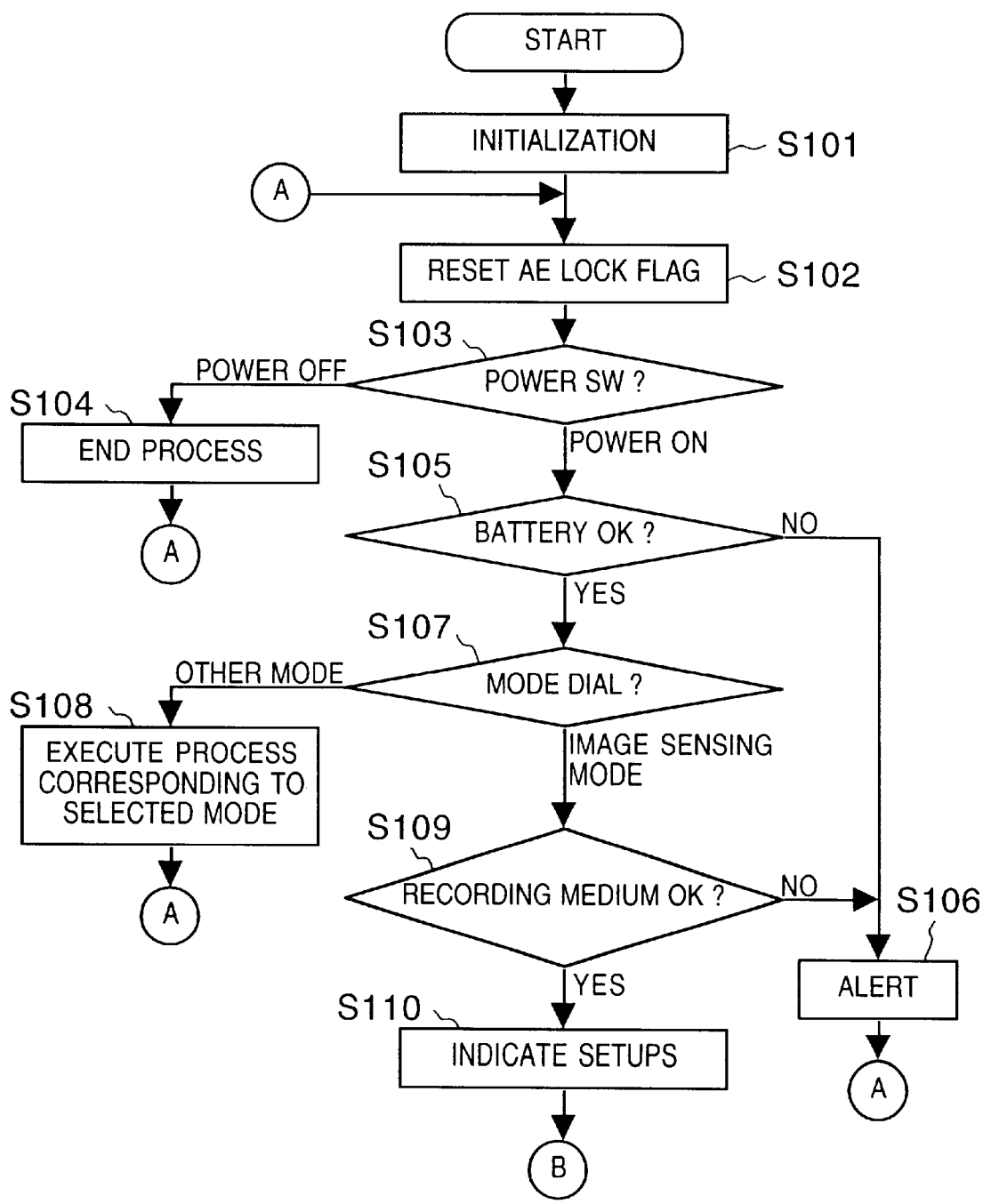
FIG. 2 is a flow chart of a main routine showing the control sequence of the image sensing apparatus.
Figure 3:
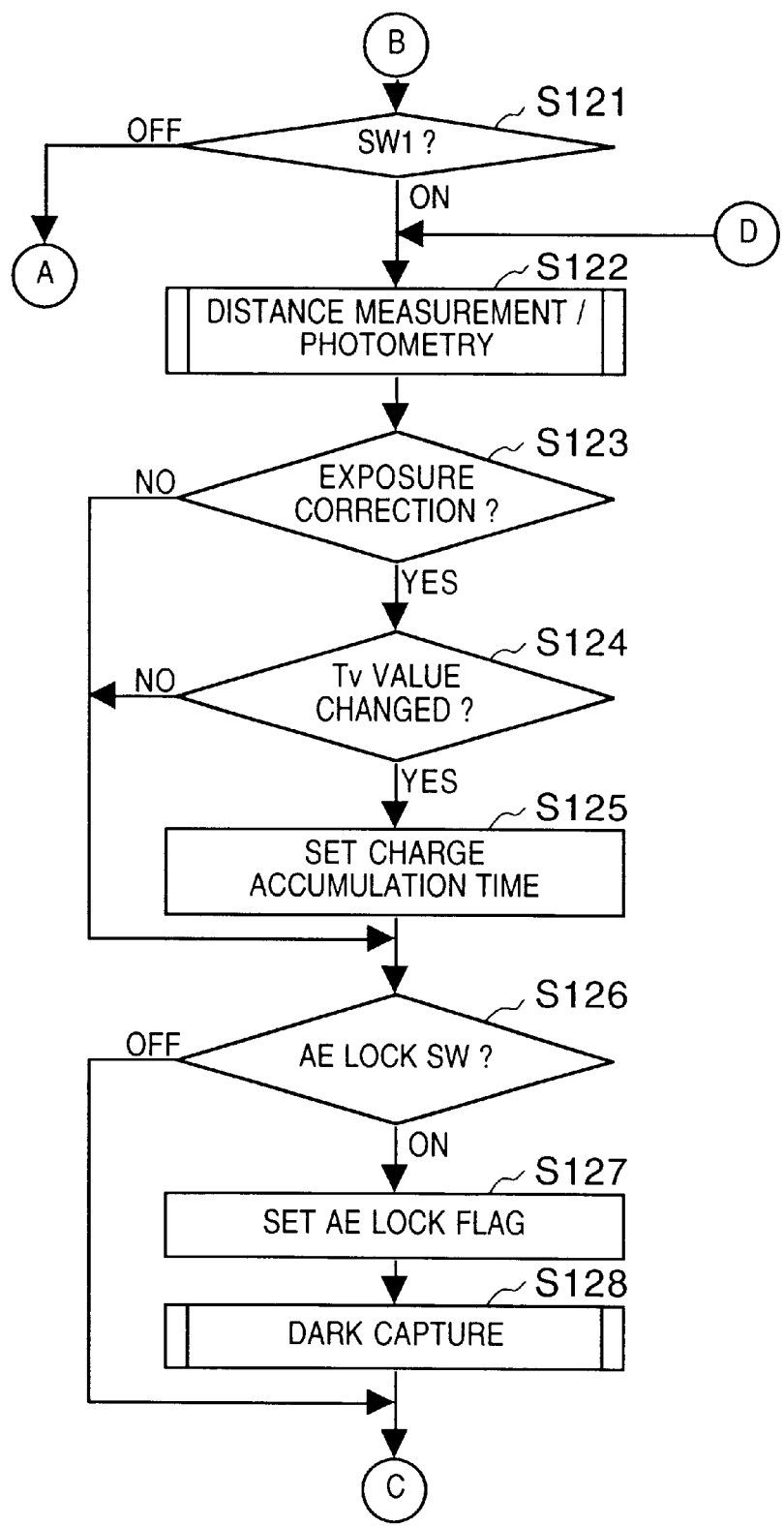
FIG. 3 is a flow chart of the main routine showing the control sequence of the image sensing apparatus and continued from FIG. 2.
Figure 4:
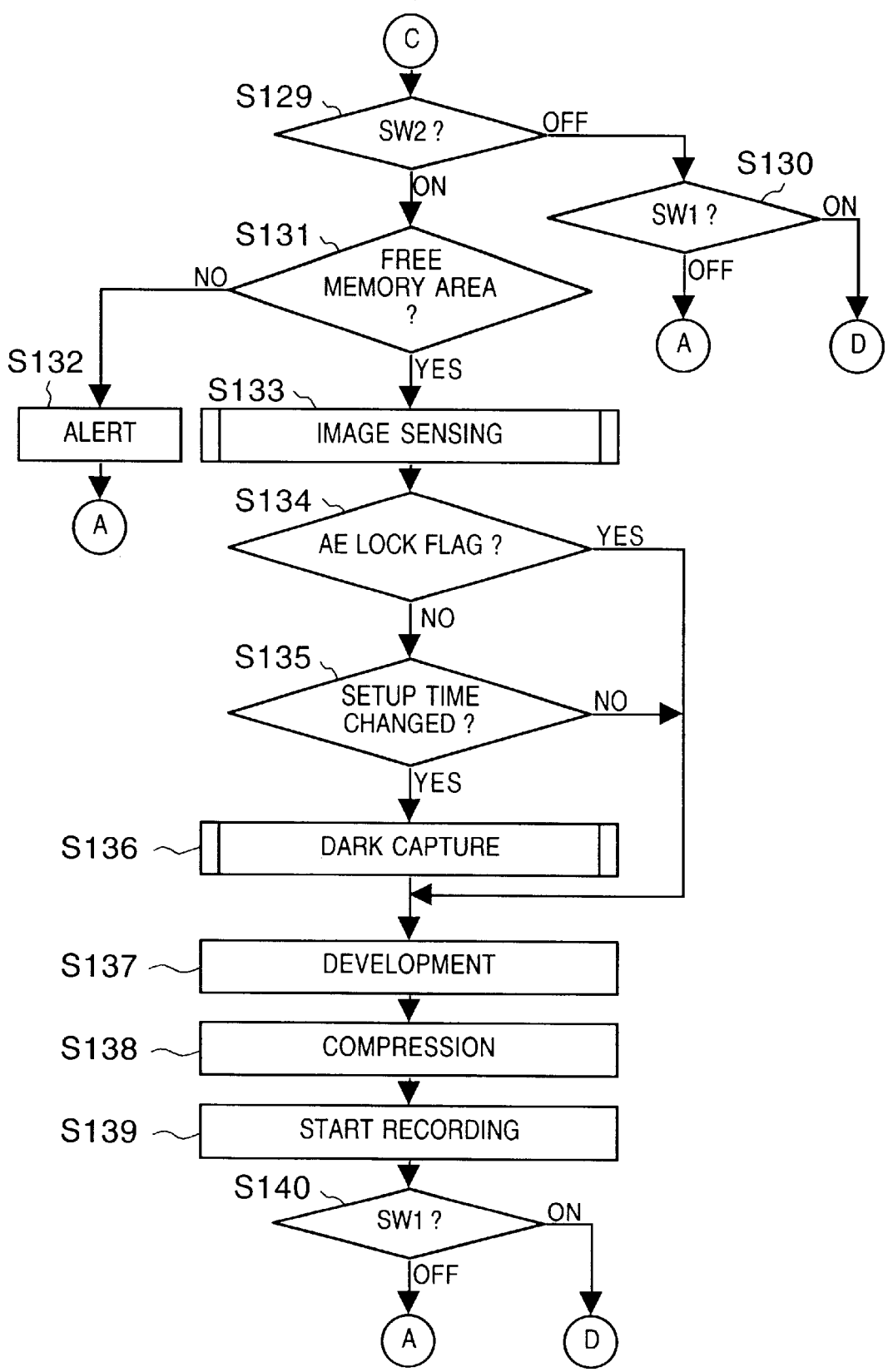
FIG. 4 is a flow chart of the main routine showing the control sequence of the image sensing apparatus and continued from FIG. 3.

FIGS. 2 to 4 are flow charts of the main routine showing the control sequence of the image sensing apparatus 100.

Referring to FIG. 2, upon power ON after battery exchange or the like, the system control circuit 50 initializes flags, control variables, and the like and also performs required predetermined initial setups in the respective units of the image sensing apparatus 100 (S101). Also, the system control circuit 50 resets an AE lock flag stored in its internal memory or the memory 52 (S102).

The system control circuit 50 checks the setup position of the power switch 72 (S103). If the power switch 72 is set at the power-OFF position, the system control circuit 50 executes a predetermined end process (S104). More specifically, the system control circuit 50 changes the indications of the respective indication units to an end state, records required parameters and setup values including flags, control variables, and the like, and the currently selected mode in the nonvolatile memory 56, cuts off unnecessary power supply to the respective units of the image sensing apparatus 100 including the image display unit 28 by the power supply control circuit 80, and so forth. After that, the flow returns to step S102.

If the power switch 72 is set at the power-ON position (S103), the system control circuit 50 checks if the remaining capacity and operation state of the power supply 86 comprising batteries and the like pose any problem in the operation of the image sensing apparatus 100 (S105). If any problem is found, a predetermined alert indication is made by means of an image or voice using the indication unit 54 (S106), and the flow then returns to step S102.

If no problem is found in the power supply 86 (S105), the system control circuit 50 checks the setup position of the mode dial switch 60 (S107). If the mode dial switch 60 is set at one of the image sensing mode positions, the flow advances to step S109.

If the mode dial switch 60 is set at any of other mode positions (S107), the system control circuit 50 executes a process corresponding to the selected mode (S108), and the flow returns to step S102 upon completion of the process.

The system control circuit 50 checks if the recording medium 200 or 210 is attached, acquires management information of image data recorded on the recording medium 200 or 210, and then checks if the operation state of the recording medium 200 or 210 poses any problem in the operation of the image sensing apparatus 100, in particular, recording/playback of image data to/from the recording medium 200 or 210 (S109). If any problem is found, a predetermined alert indication is made by means of an image or voice using the indication unit 54 (S106), and the flow then returns to step S102.

If it is determined in step S109 that no problem is found, the flow advances to step S110.

The system control circuit 50 indicates various setup states of the image display apparatus 100 by means of an image or voice using the indication unit 54 (S110). When the image display of the image display unit 28 is ON, various setup states of the image display apparatus 100 are indicated by means of an image also using the image display unit 28.

Referring to FIG. 3, it is checked if the shutter switch SW1 is ON (S121). If the shutter switch SW1 is OFF, the flow returns to step S102.

If the shutter switch SW1 is ON (S121), the system control circuit 50 executes a distance measurement/photometry process (S122). More specifically, the system control circuit 50 executes a distance measurement process for bringing the photographing lens 310 into focus on an object, and also executes a photometry process to determine the aperture value and shutter speed. The flow then advances to step S123.

In the photometry process, the electronic flash is set if necessary.

The distance measurement/photometry process (S122) will be described in detail later with reference to FIGS. 5 and 6.

The system control circuit 50 checks the setup state of the exposure correction switch 66, and if exposure correction is not set (S123), the flow jumps to step S126.

On the other hand, if exposure correction is set (S123), the system control circuit 50 checks if the shutter speed (Tv value) must be changed in accordance with an exposure correction value in correspondence with the selected image sensing mode and/or exposure mode (S124). If the shutter speed (Tv value) need not be changed, the flow jumps to step S126.

Note that the exposure correction switch 66 can set the number of exposure correction steps more smoothly if it uses plus and minus buttons or a rotary dial switch together.

If the shutter speed (Tv value) must be changed in accordance with the exposure correction value, the system control circuit 50 changes the shutter speed (Tv value), and sets a new charge accumulation time of the image sensing element 14 in correspondence with the changed shutter speed (Tv value) (S125).

For example, the shutter speed must be changed in correspondence with the exposure correction value in the individual image sensing modes such as an aperture (Av) priority image sensing mode, automatic image sensing mode, programmed image sensing mode, focal depth priority (depth) image sensing mode, portrait image sensing mode, landscape image sensing mode, macro image sensing mode, night scene image sensing mode, panorama image sensing mode, and the like, and in such case, a new charge accumulation time of the image sensing element 14 must be set.

Note that an image sensing process (S133) and dark capture process (S128 or S136; to be described later) are executed using the charge accumulation time set in this step.

The system control circuit 50 checks the state of the AE lock switch 68 (S126). If the AE lock switch 68 is OFF, the flow jumps to step S129.

If the AE lock switch 68 is ON, the system control circuit 50 sets the AE lock flag (S127), and executes a dark capture process for accumulating noise components such as dark current and the like of the image sensing element 14 for the same period of time as that required for actual image sensing, while closing the shutter 12, and reading out the accumulated noise image signal (S128), and the flow then advances to step S129.

Note that the state of the AE lock flag is stored in the internal memory of the system control circuit 50 or the memory 52.

By making correction computations using dark image data captured by the dark capture process, sensed image data can be corrected for image quality deterioration such as pixel omission or the like caused by dark current noise produced by the image sensing element 14 and scratches unique to the image sensing element 14.

The dark capture process (S128) will be described in detail later using FIG. 8.

In this manner, if it is determined in step S126 that the AE lock switch is set, the dark capture process (S128) is done prior to continuous shot image sensing. With this control, nearly constant continuous shot frame intervals can be set upon executing continuous shot image sensing by depressing the shutter switch SW2 in step S129 (to be described later).

Referring to FIG. 4, the system control circuit 50 checks if the shutter switch SW2 is ON (S129). If the shutter switch SW2 is OFF, the system control circuit 50 checks the state of the shutter switch SW1 (S130).

If the shutter switch SW1 is turned off (S130), the flow returns to step S102. If the shutter switch SW1 is ON (S130), the flow returns to step S122.

If the shutter switch SW2 is ON (S129), the system control circuit 50 checks if an area that can store sensed image data is available on an image storage buffer area on the memory 30 (S131). If no area that can store new image data is available on the image storage buffer area on the memory 30, a predetermined alert indication is made by means of an image or voice using the indication unit 54 (S132), and the flow then returns to step S102.

For example, the user experiences such state immediately after he or she has executed continuous shot image sensing corresponding to a maximum number of images that can be stored in the image storage buffer area. In this state, the first image to be read out from the memory 30 and written in the recording medium 200 or 210 is not recorded on the recording medium 200 or 210 yet, and a free area even for one image cannot be assured on the image storage buffer area on the memory 30. When sensed image data is stored in the image storage buffer area on the memory 30 after it is compressed, it is checked in step S131 if an area that can store sensed image data is available on the image storage buffer area on the memory 30, in consideration of the fact that the compressed image data size varies depending on the setups of the compression mode.

If an area that can store sensed image data is available on the image storage buffer area on the memory 30 (S131), the system control circuit 50 executes an image sensing process (S133). More specifically, the system control circuit 50 reads out a sensed image signal, which has been accumulated for a predetermined period of time upon image sensing, from the image sensing element 14, and writes the sensed image data on the predetermined area of the memory 30 via the A/D converter 16, image processing circuit 20, and memory control circuit 22, or from the A/D converter 16 directly via the memory control circuit 22.

The image sensing process (S133) will be explained in detail later using FIGS. 7 and 8.

Upon completion of the image sensing process (S133), the system control circuit 50 checks the state of the AE lock flag stored in its internal memory or the memory 52 (S134). If the AE lock flag is set, the flow jumps to step S137.

If it is determined in step S134 that the AE lock flag is set, since the dark capture process has already been done in step S128 prior to continuous shot image sensing, a development process (S137) is executed without executing another dark capture process in step S136 (to be described later). In this manner, nearly constant continuous shot frame intervals can be set.

If the AE lock flag is not set (S134), the system control circuit 50 checks if a new dark capture process must be done or if the charge accumulation time has changed in the image sensing process (S133), a setup time for charge accumulation time in the dark capture process has been changed accordingly, and the dark capture process must be redone (S135). If the dark capture process must be done, the flow advances to step S136.

For example, if the continuous shot mode is started while the AE lock flag is not set, a new dark capture process must be done immediately after the first frame has been sensed. For this purpose, a new setup time used in step S403 in the dark capture process in FIG. 9 (to be described later) is set.

Or if the continuous shot mode is started while the AE lock flag is not set, and the exposure (AE) result detected in step S207 in a photometry process (to be described later) has changed, and the shutter speed (Tv value) and the setup time for the image sensing process in step S133 have changed accordingly, the setup time for charge accumulation used in step S403 in the dark capture process in FIG. 9 (to be described later) is changed.

On the other hand, if the setup time need not be changed (S135), the flow jumps to step S137 without executing any dark image data capture process.

In this case, a dark noise correction process can be done using the already captured dark image data in a development process (S137).

The system control circuit 50 executes a dark capture process for accumulating noise components such as dark current and the like of the image sensing element 14 for the same period of time as that required for actual image sensing, while closing the shutter 12, and reading out the accumulated noise image signal (S136), and the flow advances to step S137.

By making correction computations using dark image data captured by the dark capture process, sensed image data can be corrected for image quality deterioration such as pixel omission or the like caused by dark current noise produced by the image sensing element 14 and scratches unique to the image sensing element 14.

The dark capture process (S136) will be described in detail later using FIG. 9.

In this manner, if it is determined in step S134 that the AE lock flag is not set, the dark capture process (S136) is done after the image sensing process (S133), thus reducing any release time lag upon depression of the shutter switch SW2 in step S129.

The system control circuit 50 reads out some of image data written in the predetermined area of the memory 30 via the memory control circuit 22, executes a WB (white balance) integral computation process and OB (optical black) integral computation process required to execute development processes, and stores the computation results in its internal memory or the memory 52.

The system control circuit 50 reads out sensed image data written in the predetermined area of the memory 30 using the memory control circuit 22 and the image processing circuit 20 as needed, and executes various development processes including AWB (auto white balance) process, gamma conversion, color conversion, and the like using the computation results stored in its internal memory or the memory 52 (S137).

Furthermore, in the development processes, the system control circuit 50 also executes a dark correction computation process for canceling dark current noise and the like of the image sensing element 14 by executing a subtraction process using the dark image data captured in the dark capture process.

The system control circuit 50 reads out image data written in the predetermined area of the memory 30, makes the compression/expansion circuit 32 execute an image compression process in accordance with the selected mode (S138), and writes the image data that has sensed and undergone a series of processes in a free image space of the image storage buffer area on the memory 30.

Upon executing a series of processes, the system control circuit 50 starts a recording process for reading out image data stored in the image storage buffer area of the memory 30, and writing the readout image data in the recording medium 200 or 210 such as a memory card, compact flash card, or the like (S139).

This recording process is started for new image data, which has been sensed and undergone a series of processes, every time that image data is written in a free image space of the image storage buffer area on the memory 30.

While a write of image data in the recording medium 200 or 210 is underway, a recording medium write access indication (e.g., flashing an LED of the indication unit 54) is made to clearly indicate that write access.

The system control circuit 50 checks if the shutter switch SW1 is ON (S140).

If the shutter switch SW1 is OFF (S140), the flow returns to step S102. If the shutter switch SW1 is ON (S140), the flow returns to step S122.

Figure 5:
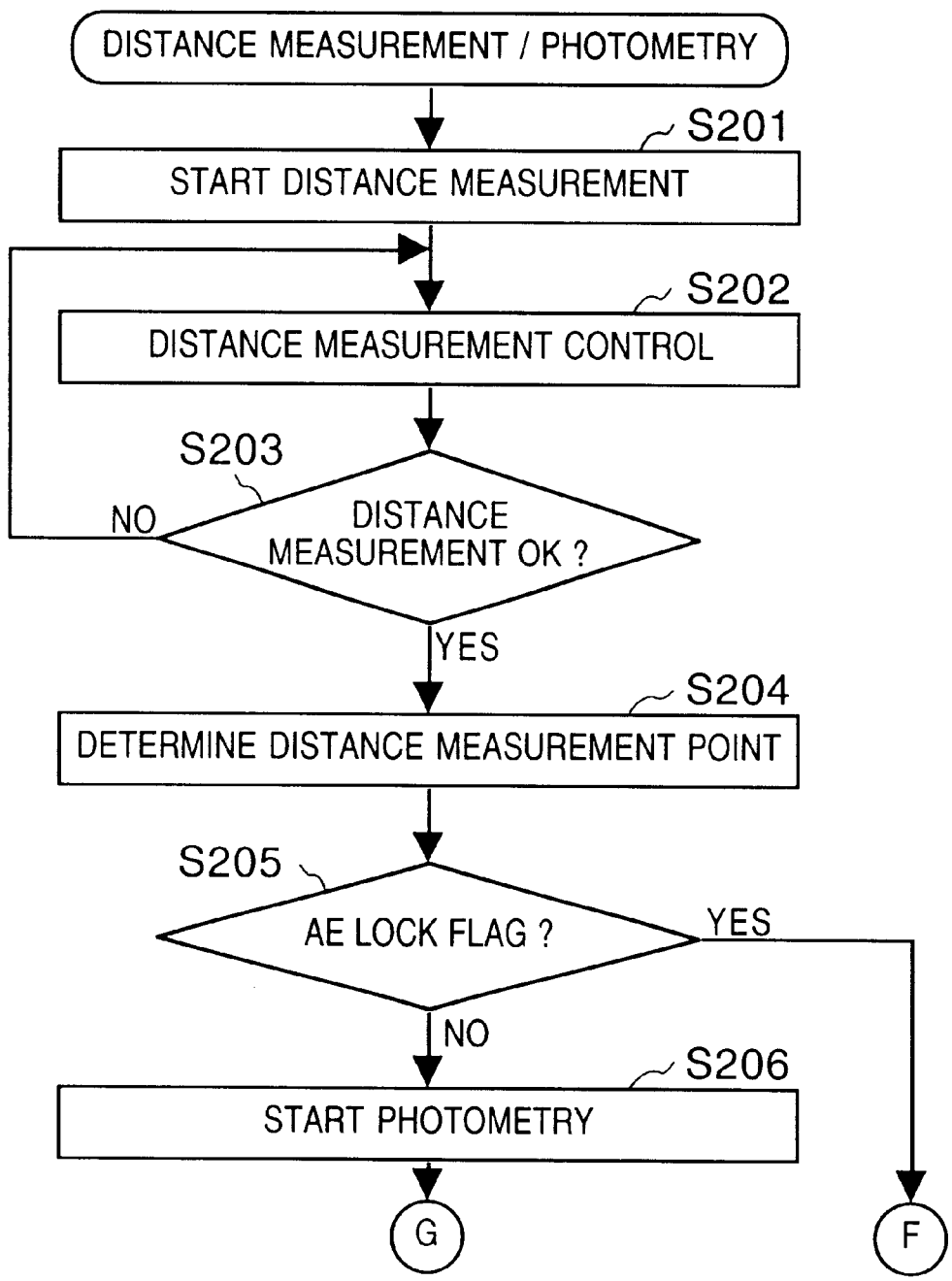
FIG. 5 is a flow chart showing the detailed sequence of a distance measurement/photometry process in step S122 in FIG. 3.
Figure 6:
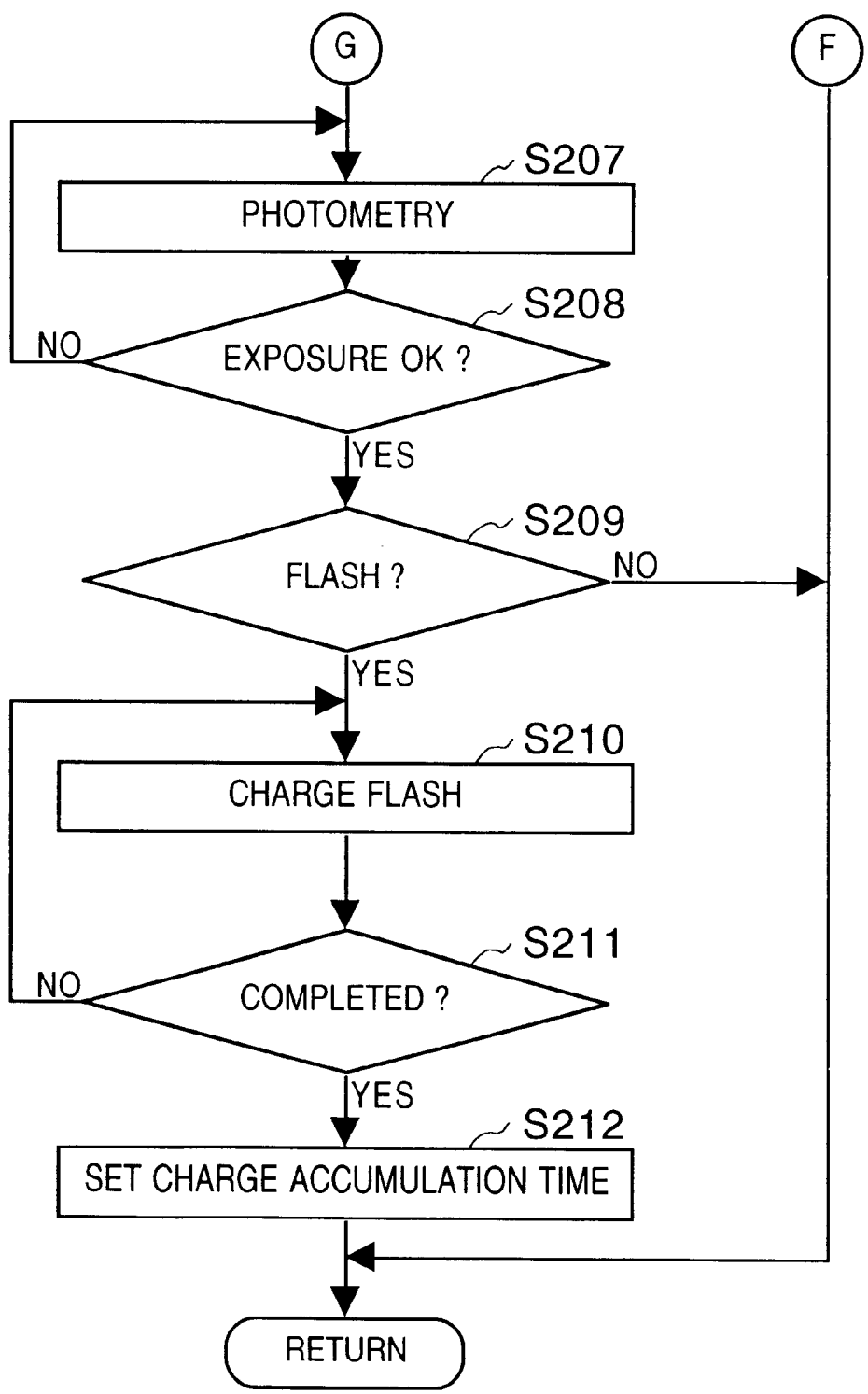
FIG. 6 is a flow chart showing the detailed sequence of the distance measurement/photometry process in step S122 in FIG. 3 and continued from FIG. 5.

FIGS. 5 and 6 are flow charts showing the detailed sequence of the distance measurement/photometry process in step S122 in FIG. 3.

In the distance measurement/photometry process, the system control circuit 50 and the stop control circuit 340 or distance measurement control circuit 342 exchange various signals via the interface 120, connectors 122 and 322, interface 320, and lens control circuit 350.

Referring to FIG. 5, the system control circuit 50 starts an AF (auto-focusing) process using the image sensing element 14, distance measurement circuit 42, and distance measurement control circuit 342 (S201).

The system control circuit 50 executes AF control for checking the focusing state of an image formed as an optical image by guiding light rays, which have entered the lens 310, to the distance measurement circuit 42 via the stop 312, lens mounts 306 and 106, mirror 130, and distance measurement sub-mirror (not shown), and detecting the focusing state using the distance measurement circuit 42 while driving the lens 310 using the distance measurement control circuit 342 (S202), until the distance measurement (AF) result indicates an in-focus (S203).

If the distance measurement (AF) result indicates an in-focus (S203), the system control circuit 50 determines an in-focus distance measurement point from those in an image sensing screen (S204), and stores distance measurement data and/or setup parameters in its internal memory or the memory 52 together with the determined distance measurement point data. The flow then advances to step S205.

The system control circuit 50 checks the state of the AE lock flag stored in its internal memory or the memory 52 (S205), and if the AE lock flag is set, the distance measurement/photometry process routine (S122) ends.

In this manner, when the AE lock flag is set, since a photometry process (S207; to be described later) has already been done one or a plurality of times, and the exposure value is fixed upon depression of the AE lock switch 68, the distance measurement/photometry process routine (S122) ends without executing another photometry process.

If the AE lock flag is not set, the system control circuit 50 starts an AE (auto-exposure) process using the photometry circuit 46 (S206).

Referring to FIG. 6, the system control circuit 50 executes a photometry process using the shutter control circuit 40 (S207) for measuring the exposure state of an image formed as an optical image by guiding light rays, which have entered the lens 310, to the photometry circuit 46 via the stop 312, lens mounts 306 and 106, mirrors 130 and 132, and photometry lens (not shown), until it is determined that the exposure (AE) value is appropriate (S208).

If it is determined that the exposure (AE) value is appropriate (S208), the system control circuit 50 stores photometry data and/or setup parameters in its internal memory or the memory 52, and the flow advances to step S209.

Note that the system control circuit 50 determines the aperture value (Av value) and shutter speed (Tv value) in accordance with the exposure (AE) result detected by the photometry process (S207) and the image sensing mode selected by the mode dial switch 60.

The system control circuit 50 determines the charge accumulation time of the image sensing element 14 in accordance with the determined shutter speed (Tv value), and executes the image sensing process and dark capture process using an equal charge accumulation time.

The system control circuit 50 checks based on the measurement data obtained by the photometry process (S207) if flash emission is required (S209). If flash emission is required, the circuit 50 sets a flash flag, and charges the electronic flash 48 (S210) until charging of the electronic flash 48 is completed (S211).

Upon completion of charging of the electronic flash 48 (S211), the system control circuit 50 determines the shutter speed (Tv value) and aperture value (Av value) on the basis of the selected image sensing mode and exposure mode, and the exposure measurement result in the photometry process (S207), and sets the charge accumulation time of the image sensing element 14 used in the image sensing process (S133) and dark capture process (S128 or S136) in accordance with the determined Tv value (S212). After that, the distance measurement/photometry process routine (S122) ends.

Figure 7:
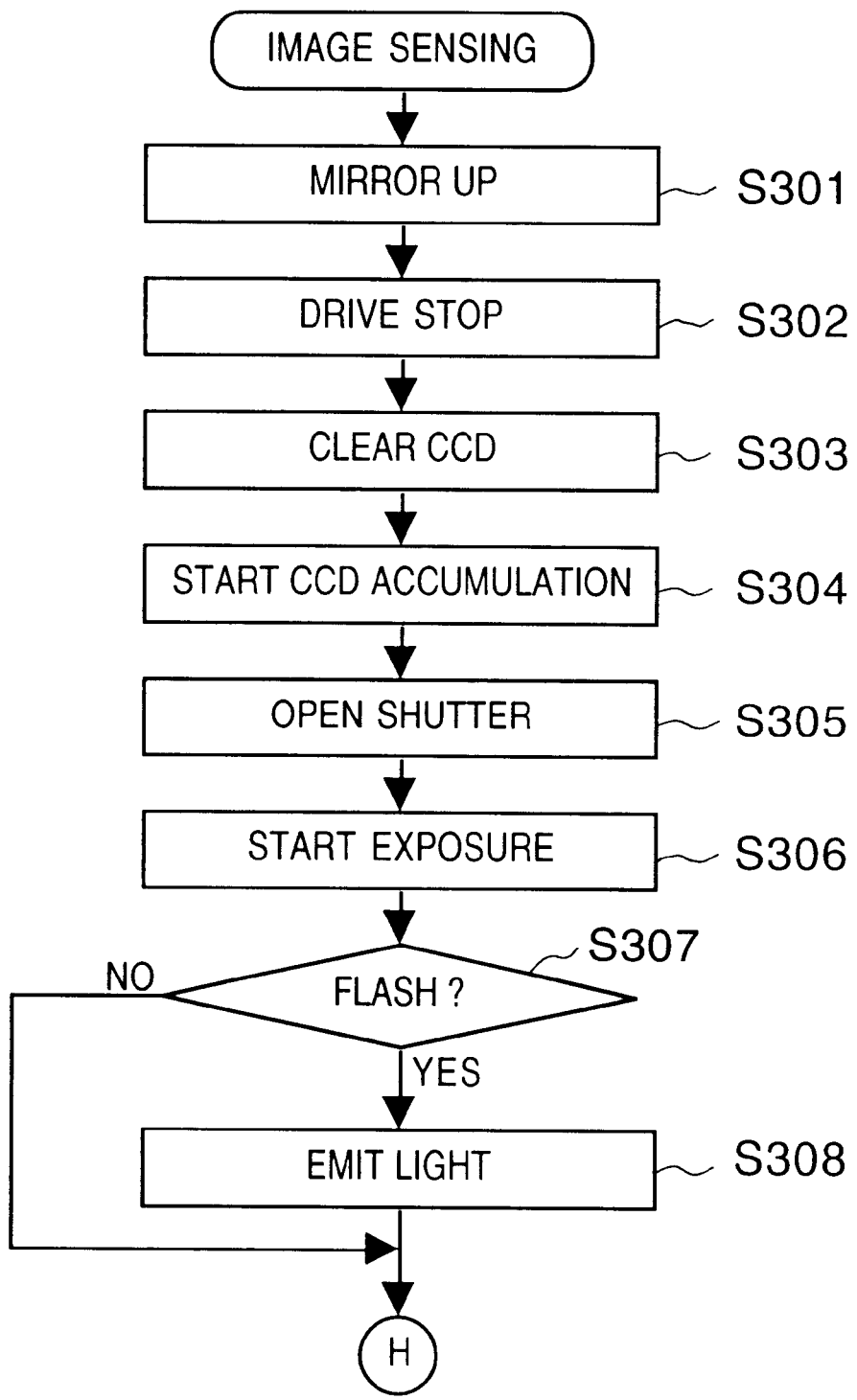
FIG. 7 is a flow chart showing the detailed sequence of an image sensing process in step S133 in FIG. 4.
Figure 8:
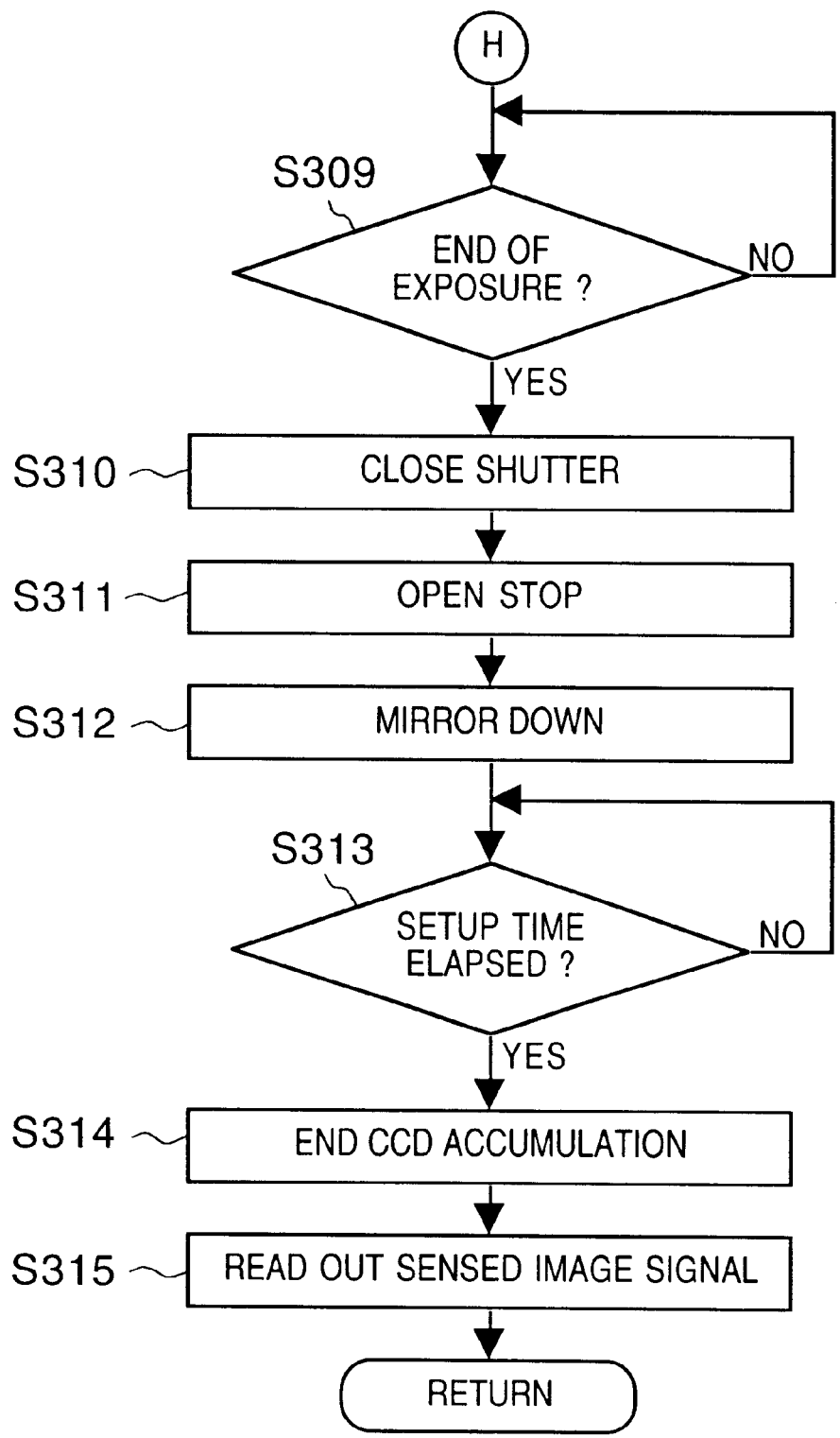
FIG. 8 is a flow chart showing the detailed sequence of the image sensing process in step S133 in FIG. 4 and continued from FIG. 7.

FIGS. 7 and 8 are flow charts showing the detailed sequence of the image sensing process in step S133 in FIG. 4.

In this image sensing process, the system control circuit 50 and the stop control circuit 340 or distance measurement control circuit 342 exchange various signals via the interface 120, connectors 122 and 322, interface 320, and lens system control circuit 350.

Referring to FIG. 7, the system control circuit 50 moves the mirror 130 to a mirror up position using a mirror driving circuit (not shown) (S301), and drives the stop 312 to a predetermined aperture value by the stop control circuit 340 in accordance with photometry data stored in its internal memory or the memory 52 (S302).

The system control circuit 50 clears charge on the image sensing element 14 (S303), then starts charge accumulation of the image sensing element 14 (S304), opens the shutter 12 by the shutter control circuit 40 (S305), and starts exposure of the image sensing element 14 (S306).

The system control circuit 50 checks based on the flash flag if the electronic flash 48 is required (S307), and if the electronic flash 48 is required, the circuit 50 controls the electronic flash 48 to emit light (S308).

Referring to FIG. 8, the system control circuit 50 waits for the end of exposure of the image sensing element 14 in accordance with the photometry data (S309), closes the shutter 12 by the shutter control circuit 40 (S310), and ends exposure of the image sensing element 14.

The system control circuit 50 drives the stop 312 to a full-open aperture value by the stop control circuit 340 (S311), and moves the mirror 130 to a mirror down position by the mirror driving circuit (not shown) (312).

If the determined charge accumulation time has elapsed (S313), the system control circuit 50 ends charge accumulation of the image sensing element 14 (S314), reads out a charge signal from the image sensing element 14, and writes sensed image data in a predetermined area of the memory 30 via the A/D converter 16, image processing circuit 20, and memory control circuit 22, or from the A/D converter 16 directly via the memory control circuit 22 (S315).

Upon completion of a series of processes, the image sensing process routine (S133) ends.

Figure 9:
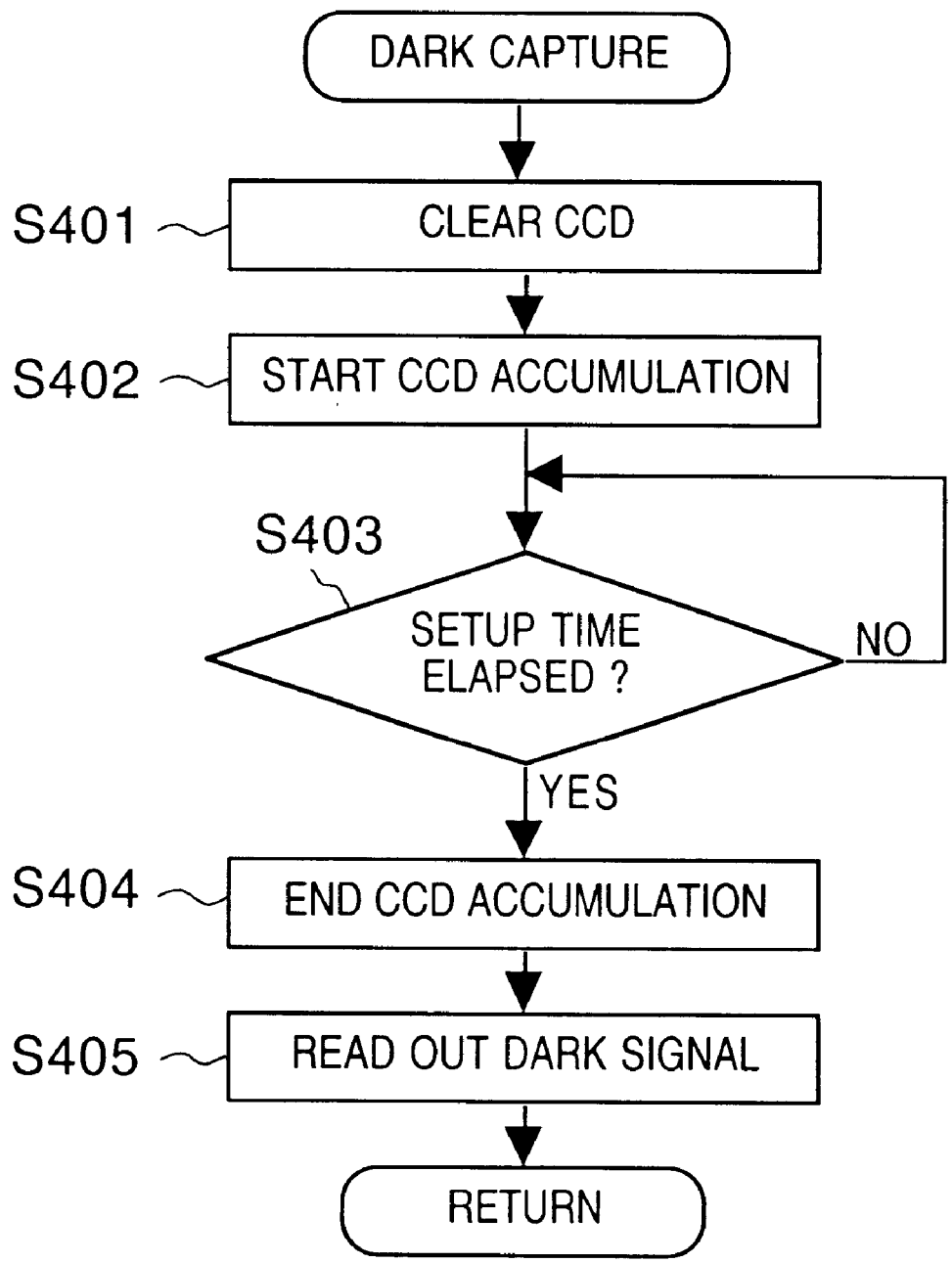
FIG. 9 is a flow chart showing the detailed sequence of a dark capture process in step S128 in FIG. 3 and step S136 in FIG. 4.

FIG. 9 is a flow chart showing the detailed sequence of the dark capture process in step S128 in FIG. 3 and step S136 in FIG. 4.

The system control circuit 50 clears charge on the image sensing element 14 (S401), and starts charge accumulation of the image sensing element 14 while the shutter 12 is closed (S402).

If a predetermined charge accumulation time has elapsed (S403), the system control circuit 50 ends charge accumulation of the image sensing element 14 (S404), reads out a charge signal from the image sensing element 14, and writes image data (dark image data) in a predetermined area of the memory 30 via the A/D converter 16, image processing circuit 20, and memory control circuit 22, or from the A/D converter 16 directly via the memory control circuit 22 (S405).

By executing the development process using this dark capture data, sensed image data can be corrected for image quality deterioration such as pixel omission or the like caused by dark current noise produced by the image sensing element 14 and scratches unique to the image sensing element 14.

Note that this dark image data is held on the predetermined area of the memory 30 until a new distance measurement/photometry process is done or the power switch of the image sensing apparatus 100 is turned off.

This dark image data is used when the next image sensing process is done, and image data sensed by that process is read out to execute the development process.

Or when image data sensed by the image sensing process and read out from the image sensing element 14 has already been written in the memory 30, the development process is executed using dark image data.

Upon completion of a series of processes, the dark capture process routine (S128 and S136) ends.

Figure 10:
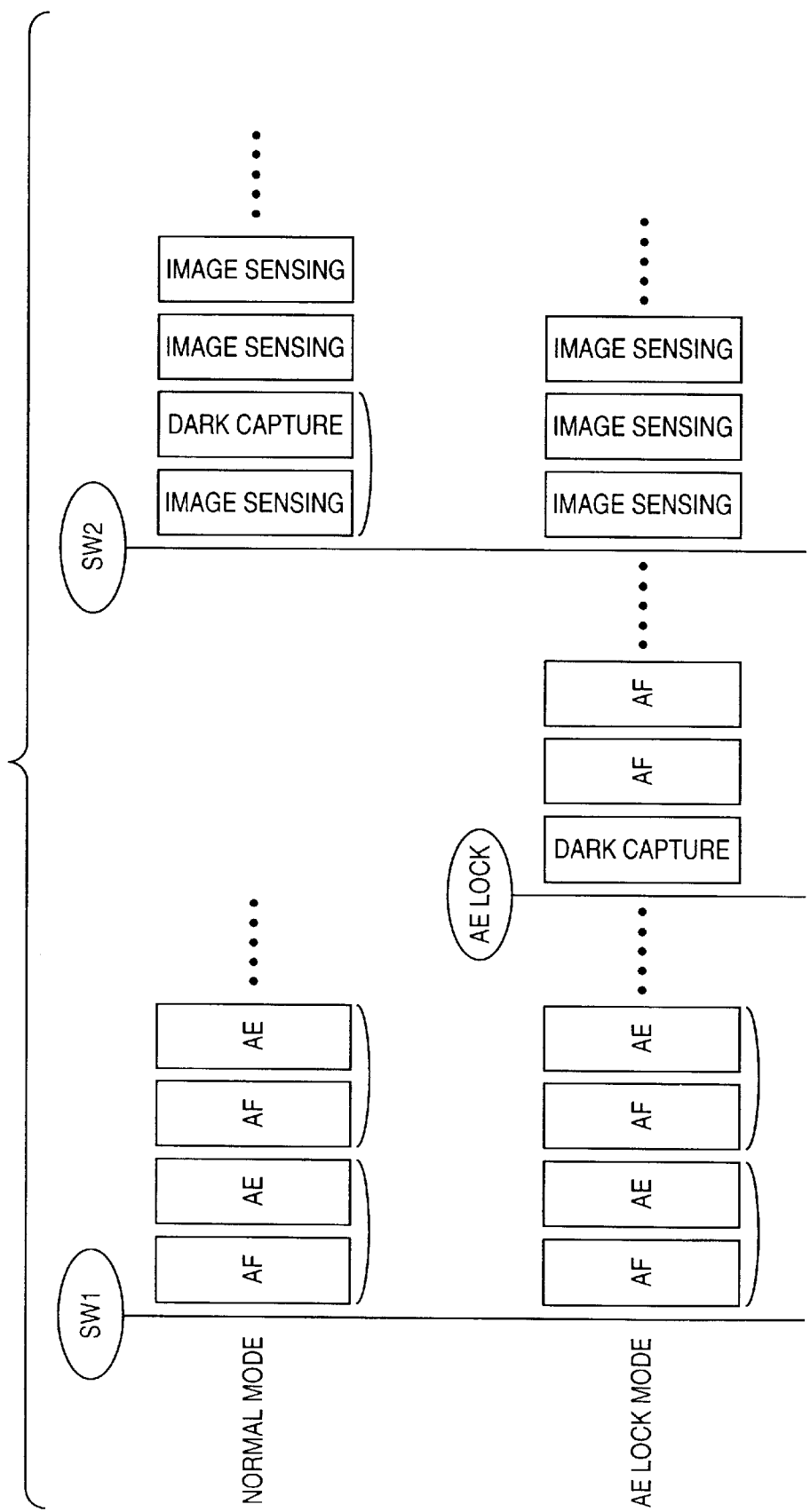
FIG. 10 is a timing chart showing the flow of image sensing operation in the first embodiment.

FIG. 10 is a timing chart showing the flow of image sensing operation in the first embodiment.

As can be seen from FIG. 10, when AE lock is not set, image sensing is immediately done upon depression of the shutter switch SW2, thus reducing any release time lag.

On the other hand, when AE lock is set, the dark capture process is done prior to continuous shot image sensing. In this manner, when continuous shot image sensing is started upon depression of the shutter switch SW2, nearly constant continuous shot frame intervals can be set.

[Second Embodiment]

The second embodiment will be described below.

Since the arrangement of the second embodiment is basically the same as that of the first embodiment, the arrangement of the first embodiment will be used in the description of the second embodiment.

In the second embodiment, the contents of the control processes done by the image sensing apparatus are different from those of the first embodiment. In the first embodiment, upon depression of the shutter switch SW2, the dark capture process (S136) is done via the AE lock flag checking process (S134) after the image sensing process (S133) is executed. However, in the second embodiment, upon depression of the shutter switch SW2, the image sensing process (S133) is done after the dark capture process (S136) is executed via the AE lock flag checking process (S134).

Figure 11:
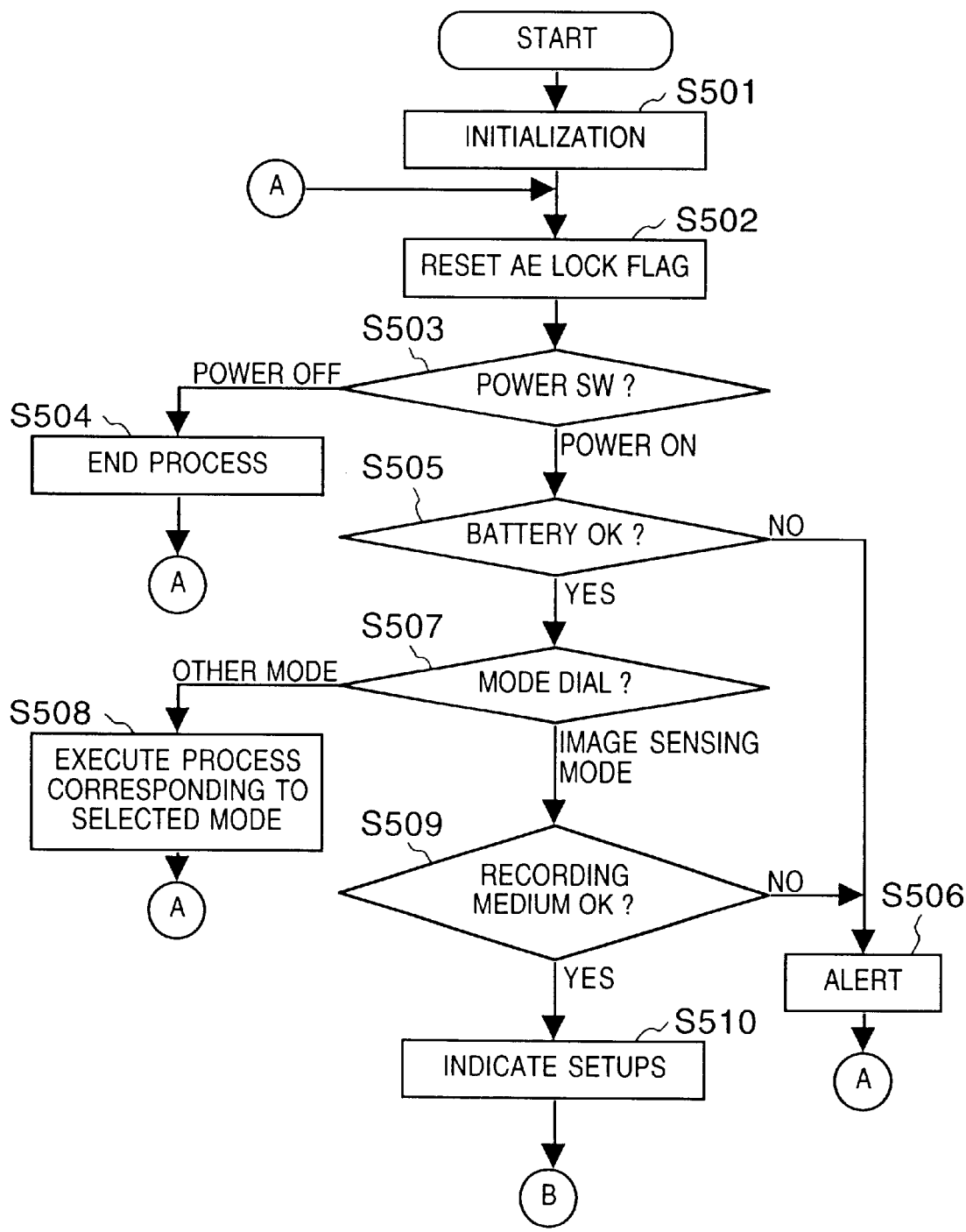
FIG. 11 is a flow chart of a main routine showing the control sequence of an image sensing apparatus according to the second embodiment.
Figure 12:
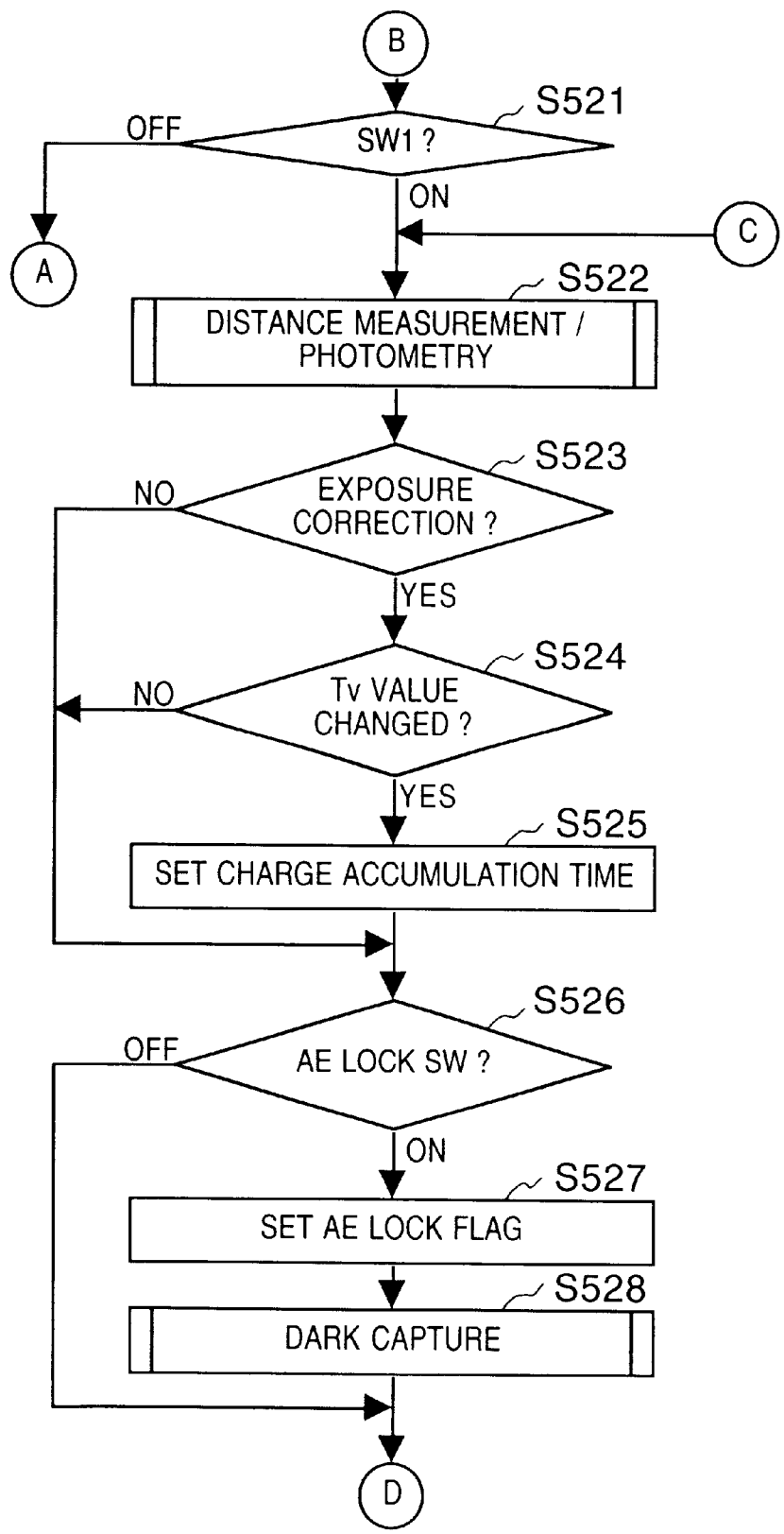
FIG. 12 is a flow chart of the main routine showing the control sequence of the image sensing apparatus according to the second embodiment and continued from FIG. 11.
Figure 13:
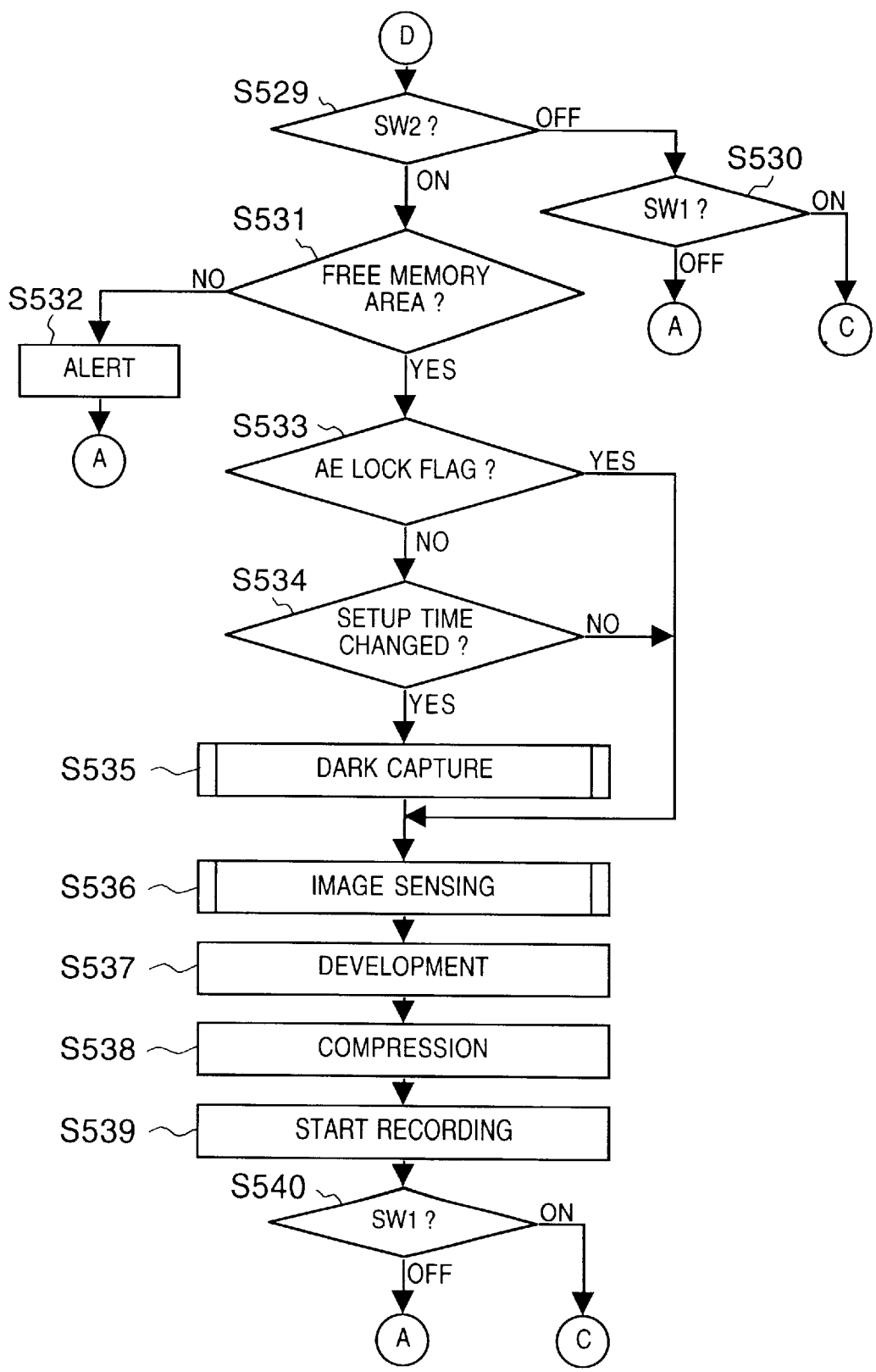
FIG. 13 is a flow chart of the main routine showing the control sequence of the image sensing apparatus according to the second embodiment and continued from FIG. 12.

FIGS. 11 to 13 are flow charts of the main routine showing the control sequence of the image sensing apparatus according to the second embodiment.

Referring to FIG. 11, upon power ON after battery exchange or the like, the system control circuit 50 initializes flags, control variables, and the like and also performs required predetermined initial setups in the respective units of the image sensing apparatus 100 (S501). Also, the system control circuit 50 resets an AE lock flag stored in its internal memory or the memory 52 (S502).

The system control circuit 50 checks the setup position of the power switch 72 (S503). If the power switch 72 is set at the power-OFF position, the system control circuit 50 executes a predetermined end process (S504). More specifically, the system control circuit 50 changes the indications of the respective indication units to an end state, records required parameters and setup values including flags, control variables, and the like, and the currently selected mode in the nonvolatile memory 56, cuts off unnecessary power supply to the respective units of the image sensing apparatus 100 including the image display unit 28 by the power supply control circuit 80, and so forth. After that, the flow returns to step S502.

If the power switch 72 is set at the power-ON position (S503), the system control circuit 50 checks if the remaining capacity and operation state of the power supply 86 comprising batteries and the like pose any problem in the operation of the image sensing apparatus 100 (S505). If any problem is found, a predetermined alert indication is made by means of an image or voice using the indication unit 54 (S506), and the flow then returns to step S502.

If no problem is found in the power supply 86 (S505), the system control circuit 50 checks the setup position of the mode dial switch 60 (S507). If the mode dial switch 60 is set at one of the image sensing mode positions, the flow advances to step S509.

If the mode dial switch 60 is set at any of other mode positions (S507), the system control circuit 50 executes a process corresponding to the selected mode (S508), and the flow returns to step S502 upon completion of the process.

The system control circuit 50 checks if the recording medium 200 or 210 is attached, acquires management information of image data recorded on the recording medium 200 or 210, and then checks if the operation state of the recording medium 200 or 210 poses any problem in the operation of the image sensing apparatus 100, in particular, recording/playback of image data to/from the recording medium 200 or 210 (S509). If any problem is found, a predetermined alert indication is made by means of an image or voice using the indication unit 54 (S506), and the flow then returns to step S502.

If it is determined in step S509 that no problem is found, the flow advances to step S510.

The system control circuit 50 indicates various setup states of the image display apparatus 100 by means of an image or voice using the indication unit 54 (S510). When the image display of the image display unit 28 is ON, various setup states of the image display apparatus 100 are indicated by means of an image also using the image display unit 28.

Referring to FIG. 12, it is checked if the shutter switch SW1 is ON (S521). If the shutter switch SW1 is OFF, the flow returns to step S502.

If the shutter switch SW1 is ON (S521), the system control circuit 50 executes a distance measurement/photometry process (S522). More specifically, the system control circuit 50 executes a distance measurement process for bringing the photographing lens 310 into focus on an object, and also executes a photometry process to determine the aperture value and shutter speed. The flow then advances to step S523.

In the photometry process, the electronic flash is set if necessary.

The detailed sequence of this distance measurement/photometry process (S522) is the same as that in the first embodiment shown in FIGS. 5 and 6.

The system control circuit 50 checks the setup state of the exposure correction switch 66, and if exposure correction is not set (S523), the flow jumps to step S526.

On the other hand, if exposure correction is set (S523), the system control circuit 50 checks if the shutter speed (Tv value) must be changed in accordance with an exposure correction value in correspondence with the selected image sensing mode and/or exposure mode (S524). If the shutter speed (Tv value) need not be changed, the flow jumps to step S526.

Note that the exposure correction switch 66 can set the number of exposure correction steps more smoothly if it uses plus and minus buttons or a rotary dial switch together.

If the shutter speed (Tv value) must be changed in accordance with the exposure correction value, the system control circuit 50 changes the shutter speed (Tv value), and sets a new charge accumulation time of the image sensing element 14 in correspondence with the changed shutter speed (Tv value) (S525).

For example, the shutter speed must be changed in correspondence with the exposure correction value in the individual image sensing modes such as an aperture (Av) priority image sensing mode, automatic image sensing mode, programmed image sensing mode, focal depth priority (depth) image sensing mode, portrait image sensing mode, landscape image sensing mode, macro image sensing mode, night scene image sensing mode, panorama image sensing mode, and the like, and in such case, a new charge accumulation time of the image sensing element 14 must be set.

Note that an image sensing process (S536) and dark capture process (S528 or S535; to be described later) are executed using the charge accumulation time set in this step.

The system control circuit 50 checks the state of the AE lock switch 68 (S526). If the AE lock switch 68 is OFF, the flow jumps to step S529.

If the AE lock switch 68 is ON, the system control circuit 50 sets the AE lock flag (S527), and executes a dark capture process for accumulating noise components such as dark current and the like of the image sensing element 14 for the same period of time as that required for actual image sensing, while closing the shutter 12, and reading out the accumulated noise image signal (S528), and the flow then advances to step S529.

Note that the state of the AE lock flag is stored in the internal memory of the system control circuit 50 or the memory 52.

By making correction computations using dark image data captured by the dark capture process, sensed image data can be corrected for image quality deterioration such as pixel omission or the like caused by dark current noise produced by the image sensing element 14 and scratches unique to the image sensing element 14.

The detailed sequence of this dark capture process (S528) is the same as that in the first embodiment shown in FIG. 9.

In this manner, if it is determined in step S526 that the AE lock switch is set, the dark capture process (S528) is done prior to continuous shot image sensing. With this control, nearly constant continuous shot frame intervals can be set upon executing continuous shot image sensing by depressing the shutter switch SW2 in step S529 (to be described later).

Referring to FIG. 13, the system control circuit 50 checks if the shutter switch SW2 is ON (S529). If the shutter switch SW2 is OFF, the system control circuit 50 checks the state of the shutter switch SW1 (S530). If the shutter switch SW1 is turned off (S530), the flow returns to step S502. If the shutter switch SW1 is ON (S530), the flow returns to step S522.

If the shutter switch SW2 is ON (S529), the system control circuit 50 checks if an area that can store sensed image data is available on an image storage buffer area on the memory 30 (S531). If no area that can store new image data is available on the image storage buffer area on the memory 30, a predetermined alert indication is made by means of an image or voice using the indication unit 54 (S532), and the flow then returns to step S502.

For example, the user experiences such state immediately after he or she has executed continuous shot image sensing corresponding to a maximum number of images that can be stored in the image storage buffer area. In this state, the first image to be read out from the memory 30 and written in the recording medium 200 or 210 is not recorded on the recording medium 200 or 210 yet, and a free area even for one image cannot be assured on the image storage buffer area on the memory 30.

When sensed image data is stored in the image storage buffer area on the memory 30 after it is compressed, it is checked in step S531 if an area that can store sensed image data is available on the image storage buffer area on the memory 30, in consideration of the fact that the compressed image data size varies depending on the setups of the compression mode.

If an area that can store sensed image data is available on the image storage buffer area on the memory 30 (S531), the system control circuit 50 checks the state of the AE lock flag stored in its internal memory or the memory 52 (S533). If the AE lock flag is set, the flow jumps to step S536.

If it is determined in step S533 that the AE lock flag is set, since the dark capture process has already been done in step S528, an image sensing process (S536) is executed without executing another dark capture process in step S535 (to be described later). In this manner, the release time lag upon depression of the shutter switch SW2 in step S529 can be reduced.

If the AE lock flag is not set (S533), the system control circuit 50 checks if a new dark capture process must be done or if the charge accumulation time has changed in the image sensing process (S536), a setup time for charge accumulation time in the dark capture process has been changed accordingly, and the dark capture process must be redone (S534). If the dark capture process must be done, the flow advances to step S535.

For example, if the continuous shot mode is started while the AE lock flag is not set, a new dark capture process must be done immediately after the first frame has been sensed. For this purpose, a new setup time used in step S403 in the dark capture process in FIG. 9 (the same process is also done in the second embodiment) is set.

Or if the continuous shot mode is started while the AE lock flag is not set, and the exposure (AE) result detected in step S207 in a photometry process (the same process is also done in the second embodiment) has changed, and the shutter speed (Tv value) and the setup time for the image sensing process in step S536 have changed accordingly, the setup time for charge accumulation used in step S403 in the dark capture process in FIG. 9 is changed.

On the other hand, if the setup time need not be changed (S534), the flow jumps to step S536 without executing any dark image data capture process.

In this case, a dark noise correction process can be done using the already captured dark image data in a development process (S537).

The system control circuit 50 executes a dark capture process for accumulating noise components such as dark current and the like of the image sensing element 14 for the same period of time as that required for actual image sensing, while closing the shutter 12, and reading out the accumulated noise image signal (S535), and the flow advances to step S536.

By making correction computations using dark image data captured by the dark capture process, sensed image data can be corrected for image quality deterioration such as pixel omission or the like caused by dark current noise produced by the image sensing element 14 and scratches unique to the image sensing element 14.

The detailed sequence of the dark capture process (S535) is the same as that in the first embodiment shown in FIG. 9.

In this manner, if it is determined in step S533 that the AE lock flag is not set, the image sensing process (S536) is done after the dark capture process (S535), thus setting nearly constant continuous frame intervals upon executing continuous shot image sensing by depressing the shutter switch SW2 in step S529.

The system control circuit 50 executes an image sensing process (S536). More specifically, the system control circuit 50 reads out a sensed image signal, which has been accumulated for a predetermined period of time upon image sensing, from the image sensing element 14, and writes the sensed image data on the predetermined area of the memory 30 via the A/D converter 16, image processing circuit 20, and memory control circuit 22, or from the A/D converter 16 directly via the memory control circuit 22.

The detailed sequence of the image sensing process (S536) is the same as that in the first embodiment shown in FIGS. 7 and 8.

The system control circuit 50 then executes a development process (S537). That is, the system control circuit 50 reads out some of image data written in the predetermined area of the memory 30 via the memory control circuit 22, executes a WB (white balance) integral computation process and OB (optical black) integral computation process required to execute development processes, and stores the computation results in its internal memory or the memory 52.

The system control circuit 50 reads out sensed image data written in the predetermined area of the memory 30 using the memory control circuit 22 and the image processing circuit 20 as needed, and executes various development processes including AWB (auto white balance) process, gamma conversion, color conversion, and the like using the computation results stored in its internal memory or the memory 52.

Furthermore, in the development processes, the system control circuit 50 also executes a dark correction computation process for canceling dark current noise and the like of the image sensing element 14 by executing a subtraction process using the dark image data captured in the dark capture process.

The system control circuit 50 reads out image data written in the predetermined area of the memory 30, makes the compression/expansion circuit 32 execute an image compression process in accordance with the selected mode (S538), and writes the image data that has sensed and undergone a series of processes in a free image space of the image storage buffer area on the memory 30.

Upon executing a series of processes, the system control circuit 50 starts a recording process for reading out image data stored in the image storage buffer area of the memory 30, and writing the readout image data in the recording medium 200 or 210 such as a memory card, compact flash card, or the like (S539).

This recording process is started for new image data, which has been sensed and undergone a series of processes, every time that image data is written in a free image space of the image storage buffer area on the memory 30.

While a write of image data in the recording medium 200 or 210 is underway, a recording medium write access indication (e.g., flashing an LED of the indication unit 54) is made to clearly indicate that write access.

The system control circuit 50 checks if the shutter switch SW1 is ON (S540). If the shutter switch SW1 is OFF (S540), the flow returns to step S502. If the shutter switch SW1 is ON (S540), the flow returns to step S522.

Figure 14:
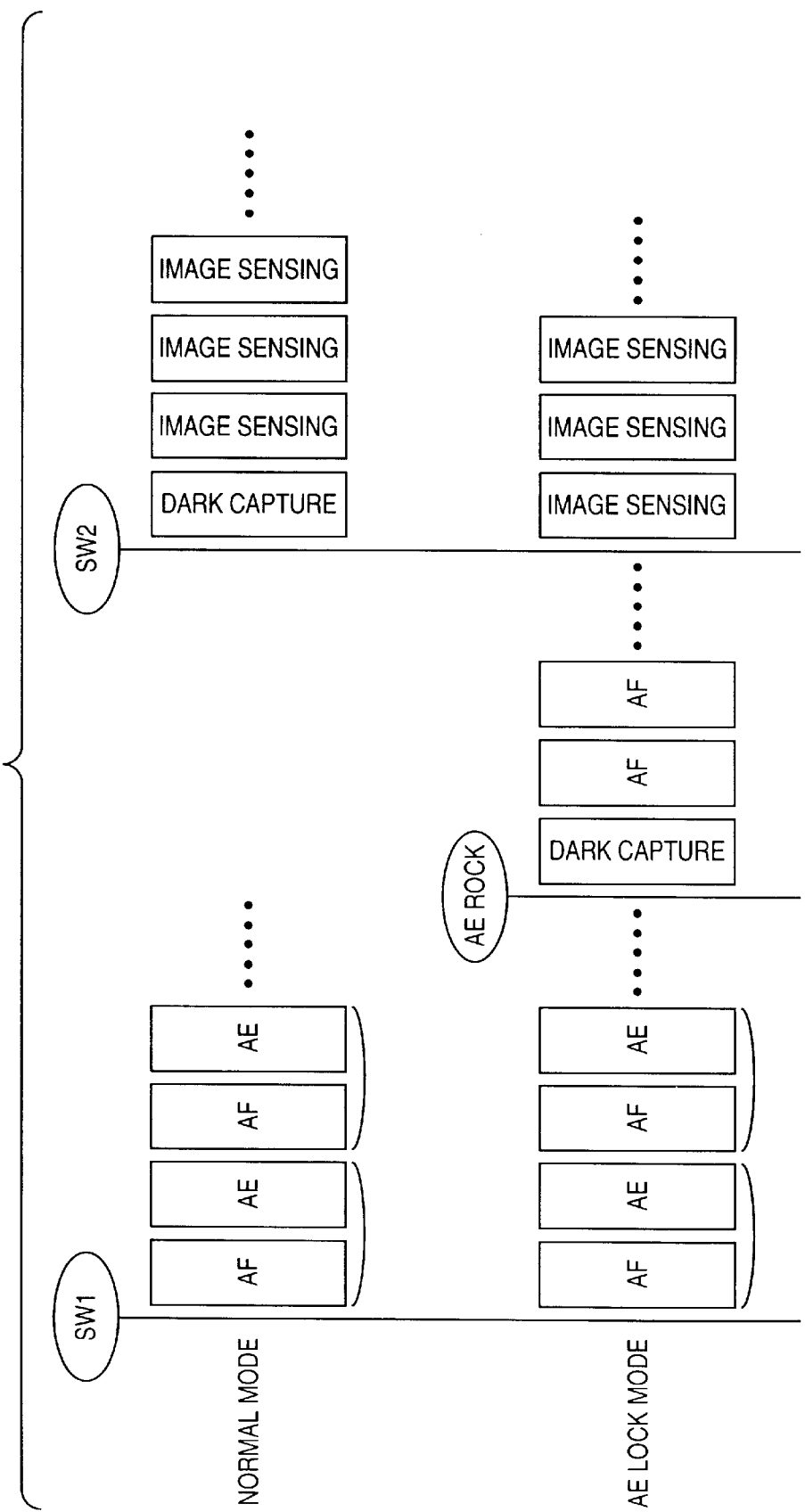
FIG. 14 is a timing chart showing the flow of image sensing operation in the second embodiment.

FIG. 14 is a timing chart showing the flow of the image sensing operation in the second embodiment.

As can be seen from FIG. 14, when AE lock is not set, the dark capture process is done prior to continuous shot image sensing upon depression of the shutter switch SW2, and nearly constant continuous shot frame intervals can be set.

On the other hand, when AE lock is set, the dark capture process is done prior to continuous shot image sensing. In this manner, upon executing continuous shot image sensing by depressing the shutter switch SW2, nearly constant continuous shot frame intervals can be set. Since the dark capture process is complete before depression of the shutter switch SW2, the release time lag upon depression of the shutter switch SW2 can be reduced.

In each of the above embodiments, the AE lock mode is set using the AE lock switch 68. Alternatively, the AE lock mode may be set upon depression of the shutter switch SW1 in correspondence with the operation mode selected by the mode dial switch 60.

In each of the above embodiments, the charge accumulation time of the actual image sensing process is set to be equal to that of the dark capture process. However, different charge accumulation times may be set as long as sufficient data that can be used to correct dark current noise and the like can be obtained. Especially, the charge accumulation time of the dark capture process is preferably set to be longer than that of the actual image sensing process, since sufficient data can be obtained.

During the dark capture process in steps S128 and S136 in the first embodiment and in steps S528 and S535 in the second embodiment, since image sensing cannot be done, a visual or audio message indicating that the dark capture process of the image sensing apparatus 100 cannot be canceled may be made using the indication unit 54 and/or image display unit 28.

In each embodiment, image sensing is done by moving the mirror 130 between the mirror up and down positions. However, the mirror 130 may comprise a half mirror, and image sensing may be done without moving the mirror.

Note that the recording media 200 and 210 are not limited to memory cards such as PCMCIA cards, compact flash cards, or the like, hard disks, and the like, but may use micro DATs (digital audio tapes), magnetooptical disks, optical disks such as CD-Rs, CD-WRs, or the like, phase change optical disks such as DVDs, and the like.

Also, the recording media 200 and 210 may use hybrid media that integrate memory cards, hard disks, and the like. Furthermore, such hybrid media may include detachable media.

In each embodiment, the recording media 200 and 210 are independent from the image sensing apparatus 100 and are arbitrarily connectable. One or both the recording media 200 and 210 may be permanently connected to the image sensing apparatus 100.

An arbitrary number (one or a plurality) of image recording media 200 or 210 may be connectable to the image sensing apparatus 100.

In the above description, the recording media 200 and 210 are attached to the image sensing apparatus. However, one or a combination of a plurality of recording media may be used.

In each of the above embodiments, an explanation has been given using the CCD as an example of the image sensing element 14. Also, when the image sensing element uses a CMOS, the above effects can be obtained.

The embodiments of the present invention have been described. However, the present invention is not limited to the arrangements of such embodiments, but may be applied to any other arrangements as long as they may achieve functions defined in the appended claims or functions of the arrangements of the embodiments.

The software and hardware arrangements of the above embodiments can be appropriately replaced.

The present invention may be achieved by combining the above embodiments or their technical components as needed.

The present invention may be applied even when all or some of claims or the arrangements of the embodiments form a single apparatus, are combined with another apparatus, or are building components of the apparatus.

The present invention can be applied to various types of cameras such as an electronic still camera, video movie camera, a camera using a silver halide film, and the like, image sensing apparatuses other than cameras, devices applied to such cameras and image sensing apparatuses, and building components of those devices.

Note that the present invention may be applied to either a system constituted by a plurality of devices, or an apparatus consisting of a single equipment.

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magnetooptical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

What is claimed is:

1. An apparatus comprising:

(A) an image sensing device;

(B) an exposure state fixing device for fixing an exposure state so as to inhibit a change of the exposure state of said image sensing device; and (C) a signal processing device for performing a first image sensing operation for causing said image sensing device to perform an image sensing operation in an exposure state, and a second image sensing operation for causing said image sensing device to perform an image sensing operation in a non-exposure state, and processing a first image signal obtained by the first image sensing operation by a second image signal obtained by the second image sensing operation, said signal processing device having a first mode for causing said image sensing device to perform the first image sensing operation and then the second image sensing operation, and a second mode for causing said image sensing device to perform the second image sensing operation and then the first image sensing operation, and said image processing device operating in the second mode if said exposure state fixing device fixes the exposure state.

2. The apparatus according to claim 1, wherein said signal processing device operates in the first mode if said exposure state fixing device does not fix the exposure state.

3. The apparatus according to claim 1, further comprising:
a storage device for storing signals obtained in the first and second modes processed by said signal processing device.

4. The apparatus according to claim 3, wherein said storage device compresses a signal processed by said signal processing device, and stores the compressed signal.

5. The apparatus according to claim 4, wherein said storage device includes a buffer.

6. The apparatus according to claim 5, further comprising a recording device for recording information stored in said storage device in a recording medium.

7. The apparatus according to claim 1, wherein said apparatus includes a camera.

8. An apparatus comprising:
(A) an image sensing device;
(B) an exposure state fixing device for fixing an exposure state so as to inhibit a change of the exposure state of said image sensing device;
(C) an exposure instruction device for issuing an exposure preparation instruction at a first stroke position of a shutter release member, and issuing an exposure start instruction at a second stroke position of the shutter release member; and
(D) a signal processing device for performing a first image sensing operation for causing said image sensing device to perform an image sensing operation in an exposure state, and a second image sensing operation for causing said image sensing device to perform an image sensing operation in a non-exposure state, and processing a first image signal obtained by the first image sensing operation by a second image signal obtained by the second image sensing operation, said signal processing device performing the second image sensing operation in response to the exposure preparation instruction issued by said exposure instruction device if said exposure state fixing device fixes the exposure state image.

9. The apparatus according to claim 8, further comprising:
a storage device for storing signals obtained in the first and second modes processed by said signal processing device.

10. The apparatus according to claim 9, wherein said storage device compresses a signal processed by said signal processing device, and stores the compressed signal.

11. The apparatus according to claim 10, wherein said storage device includes a buffer.

12. The apparatus according to claim 10, further comprising a recording device for recording information stored in said storage device in a recording medium.

13. The apparatus according to claim 8, wherein said apparatus includes a camera.

* * * * *